(12) United States Patent
Hayakawa et al.

(10) Patent No.: US 8,421,795 B2
(45) Date of Patent: Apr. 16, 2013

(54) STORAGE MEDIUM HAVING IMAGE PROCESSING PROGRAM STORED THEREON AND IMAGE PROCESSING APPARATUS

(75) Inventors: Takeshi Hayakawa, Kyoto (JP); Katsuyasu Ando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1160 days.

(21) Appl. No.: 11/898,004

(22) Filed: Sep. 7, 2007

(65) Prior Publication Data

US 2009/0015679 A1    Jan. 15, 2009

(30) Foreign Application Priority Data

Jul. 9, 2007    (JP) ................................. 2007-180291

(51) Int. Cl.
   *G06T 15/00*    (2011.01)
(52) U.S. Cl.
   USPC ............................. 345/419; 345/428; 463/31
(58) Field of Classification Search .................. None
   See application file for complete search history.

(56) References Cited

U.S. PATENT DOCUMENTS

| | | | |
|---|---|---|---|
| 6,890,263 B2 * | 5/2005 | Hiraoka et al. ................. | 463/32 |
| 6,982,717 B2 * | 1/2006 | Sakagami et al. ............ | 345/473 |
| 2004/0021680 A1 * | 2/2004 | Hara ............................. | 345/700 |
| 2006/0061567 A1 * | 3/2006 | Ouchi ........................... | 345/419 |
| 2008/0018597 A1 * | 1/2008 | Shirakura et al. ............. | 345/157 |
| 2008/0095439 A1 | 4/2008 | Okubo | |

FOREIGN PATENT DOCUMENTS

| | | |
|---|---|---|
| JP | 6-68238 | 3/1994 |
| JP | 2002170131 A | 6/2002 |
| JP | 2003-51024 A | 2/2003 |
| JP | 2004334661 A | 11/2004 |
| JP | 2006092015 A | 4/2006 |

OTHER PUBLICATIONS

Japanese Office Action dated Jan. 15, 2013, issued in corresponding Japanese Patent Application No. 2007-180291 filed Jan. 4, 2013.
Rejection dated Sep. 12, 2012 in counterpart Japanese Application No. 2007-180291.

* cited by examiner

*Primary Examiner* — Daniel Hajnik
*Assistant Examiner* — Andrew G Yang
(74) *Attorney, Agent, or Firm* — Nixon & Vanderhye P.C.

(57) ABSTRACT

The game apparatus generates an image of a virtual space viewed from a virtual camera as a reference image. The game apparatus then calculates a blurring value indicative of a blurring degree of the image. The blurring value is calculated so as to become greater than a reference value in the case where a movement amount of the virtual camera is equal to or greater than a predetermined amount, and to become smaller than the reference value in the case where the movement amount of the virtual camera is smaller than the predetermine amount. The game apparatus blurs an image outside a predetermined area of the reference image such that the blurring degree increases in accordance with an increase of the blurring value. The predetermined area is determined, from among an image area of the reference image, so as to include a position of a focus point of the virtual camera. Accordingly, a blurred image is displayed on a display apparatus.

23 Claims, 13 Drawing Sheets

STORAGE MEDIUM HAVING IMAGE PROCESSING PROGRAM STORED THEREON AND IMAGE PROCESSING APPARATUS

CROSS REFERENCE TO RELATED APPLICATION

The disclosure of Japanese Patent Application No. 2007-180291, filed Jul. 9, 2007, is incorporated herein by reference.

TECHNICAL FIELD

The present invention relates to a storage medium having an image processing program stored thereon and an image processing apparatus, and more particularly to a storage medium having an image processing program stored thereon and an image processing apparatus which are used for generating a virtual space image.

BACKGROUND AND SUMMARY

As a technique for displaying a three-dimensional image on a display apparatus, conventionally known is a technique as disclosed in Patent Document 1 (Japanese Laid-Open Patent Publication No. 6-68238). In the case where a viewpoint (a position of a virtual camera) moves in the three-dimensional space, a game apparatus described in Patent Document 1 displays in real time an image of geographic features of the three-dimensional space in accordance with a movement of the viewpoint. In the game apparatus, based on the position of the viewpoint and a viewing direction, an address of a space to be displayed on a screen is calculated, coordinate conversion is performed with respect to altitude data of the geographic features, and then a color to be displayed on the screen is determined. Accordingly, the above-described game apparatus is capable of promptly responding to the movement of the viewpoint, and displaying the image of the geographic features set within the three-dimensional space in real time without using expensive hardware.

In the three-dimensional space, in the case where the position of the viewpoint and/or the viewing direction change, an image of the three-dimensional space viewed from the viewpoint along the viewing direction, that is, an entire content of the image to be displayed on the display apparatus changes (moves). In the case where the entire content of the image changes, in this manner, it is difficult to identify the content of the image due to the change of the image, compared to a case where a part of the content of the image changes (e.g., a case where the ground surface is displayed so as to be at a standstill, and only a player object is moving). Therefore, a user may not be able to recognize a target to be focused (focusing target) in the image. For example, the user may lose sight of an object having been focused since the viewpoint has moved. In another example, the user may not be able to capture the object to be focused during the viewpoint moving. Particularly, in the case where the viewpoint moves at a high speed, or in the case where the viewing direction changes, the entire content of the image changes drastically, and thus a problem becomes significant in that the user cannot identity the focusing target.

Therefore, an aspect of the present invention is to provide an image processing program and an image processing apparatus which are capable of allowing a user to easily recognize a focusing target even in the case where a position of a viewpoint or a viewing direction changes in a three-dimensional space.

The present invention has the following features. The reference numerals, additional description and the like in parentheses described in the present section indicate the correspondence with the embodiment described below in order to aid in understanding the present invention, and are not intended to limit the scope of the present invention in any way.

A first aspect of the present invention is directed to a computer readable storage medium (optical disc 4) having stored thereon an image processing program (game program 60) executed by a computer (CPU 10 or the like) of an image processing apparatus (game apparatus 3) for displaying an image of a virtual space on a display apparatus (television 2). The image processing program causes the computer to execute a reference image generating step (S8), an area determining step (S9), a first blurring value calculation step (S10), a blurring processing step (S13), and a displaying step (S14). In the reference image generating step, the computer generates, as a reference image, the image of the virtual space viewed from a virtual camera which is set in the virtual space. In the area determining step, the computer determines, in the reference image, a predetermined area (target area) which includes pixels corresponding to a predetermined position in a viewing direction of the virtual camera. In the first blurring value calculation step, the computer calculates a first blurring value (correction value A) which indicates a blurring degree of an image. The first blurring value is calculated so as to become greater than a reference value in the case where a movement amount of the virtual camera is equal to or greater than a predetermined amount, and so as to become smaller than the reference value in the case where the movement amount of the virtual camera is smaller than the predetermined amount. In the blurring processing step, the computer blurs an area outside the predetermined area in the reference image such that the blurring degree increases in accordance with an increase in the first blurring value. In the displaying step, the computer displays an image blurred in the blurring processing step on the display apparatus.

In a second aspect, the image processing program may further cause the computer to execute a second blurring value calculation step (S9). In the second blurring value calculation step, the computer calculates a second blurring value (synthesis rate α) of respective pixels in the area outside the predetermined area, the second blurring value indicating a blurring degree of an image, in accordance with a predetermined method which is different from a calculation method for the first blurring value. In this case, in the blurring processing step, the computer determines the blurring degree of at least the pixels in the area outside the predetermined area in accordance with the first blurring value and the second blurring value, and blurs, based on the blurring degree having been determined, the pixels in the area outside the predetermined area in the reference image.

In a third aspect, in the second blurring value calculation step, the computer may calculate the second blurring value of each of the pixels in the area outside the predetermined area in accordance with a depth value (Z value) of said each of the pixels.

In a fourth aspect, in the second blurring value calculation step, the computer may calculate the second blurring value of said each of the pixels in the area outside the predetermined area such that the blurring degree increases in accordance with an increase in a difference between the depth value of said each of the pixels and a depth value at a focus point of the virtual camera.

In a fifth aspect, in the area determining step, the computer may determine the predetermined area in accordance with a position of the focus point of the virtual camera.

In a sixth aspect, in the area determining step, the computer may determine, as the predetermined area in the reference image, an area including pixels whose depth value and the depth value at the focus point are different from each other by a predetermined value or less.

In a seventh aspect, the image processing program may further cause the computer to execute a rotation step (S6) of rotating the virtual camera around the predetermined position such that the virtual camera is facing the predetermined position. In this case, in the area determining step, the computer determines, as the predetermined area, an area including pixels corresponding to an object existing in a predetermined space which includes the predetermined position in the virtual space. In the first blurring value calculation step, the computer uses a rotation amount of the virtual camera as the movement amount of the virtual camera.

In an eighth aspect, the reference image generating step may be executed repeatedly at a rate of once per predetermined time period (1 frame time period). In this case, the first blurring value calculation step is executed each time the reference image is generated in the reference image generating step. In the first blurring value calculation step, the computer calculates the first blurring value by using a most recent first blurring value as the reference value.

In a ninth aspect, in the first blurring value calculation step, the computer may calculate the first blurring value by using a predetermined value as the reference value such that the first blurring value increases in accordance with an increase in a magnitude of the movement amount.

In a tenth aspect, the image processing program may further cause the computer to execute a blurring image generating step (S12) of generating a blurred image of the reference image by using the predetermined reference image. In this case, in the blurring processing step, the computer synthesizes, as a blurring process, the reference image and the blurred image at a synthesis rate corresponding to the blurring degree.

In an eleventh aspect, the movement amount of the virtual camera is equivalent to a rotation angle of the virtual camera.

In a twelfth aspect, the movement amount of the virtual camera is equivalent to a change amount of a position of the virtual camera.

A thirteenth aspect is directed to a computer readable storage medium (optical disc 4) having stored thereon an image processing program (game program 60) causing a computer (CPU 10) to execute a process of generating an image viewed from a virtual camera situated in a virtual space. The image processing program causes the computer to execute a rotation step (S6), and an image generating step (S13). In the rotation step, the computer rotates the virtual camera. In the image generating step, in the case where a rotation amount (rotation angle) of the virtual camera per unit time exceeds a threshold amount, the computer draws a first drawing target object (start object 51, player character object 54, enemy character object 55 and the like) included in a first area which includes a center of rotation of the virtual camera, draws a second drawing target object (star objects 52 and 53) included in a second area, which surrounds the first area, so as to be a blurred image compared to the first drawing target object, and generates a screenful of a display image based on the virtual camera.

In a fourteenth aspect, in the image generating step, in the case where the rotation amount of the virtual camera per unit time does not exceeds the threshold amount, the computer may draw the second drawing target object so as to be a less blurred image compared to the second drawing target object which is drawn in the case where the rotation amount of the virtual camera per unit time exceeds the threshold amount.

In a fifteenth aspect, the image generating step may include a blurring changing step (S10, S11) of changing a blurring degree (correction value A) of the second drawing target object in accordance with the rotation amount.

In a sixteenth aspect, in the blurring changing step, the computer may change the blurring degree so as to increase the blurring degree in accordance with an increase of the rotation amount, and to decrease the blurring degree in accordance with a decrease of the rotation amount.

Further, the present invention may be provided in a form of an image processing apparatus having a function identical to the image processing apparatus executing each of the steps in the above-described first to sixteenth aspects. In the image processing apparatus, each of the steps may be executed by a CPU which executes the image processing program, or alternatively, some or all the steps may be executed by a dedicated circuit included in the image processing apparatus.

According to the first aspect, in the case where the virtual camera moves by an amount equal to or greater than the predetermined amount, the image outside the predetermined area is displayed in a blurred manner. That is, in the case where the entire image changes due to the movement of the virtual camera, the image within the predetermined area is displayed clearly compared to the image outside the predetermined area. Accordingly, it is possible to bring the user's focus within the predetermined area. Therefore, even in the case where the entire image changes, the user can easily capture and recognize the focusing target within the predetermined area.

According to the second aspect, the second blurring value, which is set for each of the pixels, is used in addition to the first blurring value, whereby the blurring processing can be performed in accordance with the blurring degree appropriate to each of the pixels.

According to the third and fourth aspects, the blurring processing is performed to various blurring degrees which varies on a pixel-by-pixel basis in accordance with a depth value of each of the pixels. Particularly, according to the fourth aspect, the blurring degree is small in the vicinity of the position of the focus point in the depth direction, and the blurring degree becomes large at a position far from the focus point in the depth direction. Accordingly, it is possible to generate an image such that the image is focused at the focus position.

According to the fifth aspect, the position of the focus point of the virtual camera is used as the above-described predetermined position, whereby the predetermined area can be determined easily.

According to the sixth aspect, pixels corresponding to the object in the vicinity of the position of the focus point in the virtual space are within the predetermined area. Accordingly, the object in the vicinity of the position of the focus point, which tends to be a focusing target of the user, is displayed without being blurred, and the object in the position far from the focus point is displayed in a blurred manner. As a result, it is possible to determine the predetermined area such that the user's focusing target is certainly included in the predetermined area, and also possible to allow the user to recognize the focusing target unfailingly.

Further in the sixth aspect, in the case where the second blurring value is calculated based on the above-described difference, it is possible to perform, by using the difference, both of the processes of calculating the second blurring value and determining the predetermined area. Accordingly, it is possible to simplify the processes compared to a case where these two processes are performed by using two variables which are different from each other, and also possible to perform these two processes efficiently.

According to the seventh aspect, compared to an object existing within the predetermined space having the center of the rotation of the virtual camera included therein, an object existing outside the predetermined space is displayed in a further blurred manner. Accordingly, even in the case where the entire image changes due to the rotation of the virtual camera, the user can easily capture and recognize the focusing target within the predetermined space.

According to the eighth and ninth aspect, the first blurring value can be easily calculated so as to be equal to a value corresponding to the movement amount of the virtual camera.

According to the tenth aspect, the blurring processing can be easily performed by synthesizing the reference image and the blurred image.

According to the eleventh aspect, the blurring degree can be changed depending on a change in the attitude of the virtual camera.

According to the twelfth aspect, the blurring degree can be changed depending on a change in the position of the virtual camera.

According to the thirteenth aspect, in the case where the virtual camera rotates at the rotation amount equal to or greater than the threshold value, the second drawing target object is displayed in a further blurred manner than the first drawing target object. That is, in the case where the entire image changes due to the rotation of the virtual camera, the first drawing target object in the first area (the area in the virtual space) is displayed further clearly than the second drawing target object in the second area (the area within the virtual space). Accordingly, it is possible to bring the user's focus within the first area. Therefore, even in the case where the entire image changes, the user can easily capture and recognize the focusing target in the first area.

According to the fourteenth aspect, in the case where the rotation amount of the virtual camera does not exceed the threshold, the second drawing target object is displayed further clearly than a case where the rotation amount exceeds the threshold value. That is, in the case where the entire image hardly changes, and the image is continuously viewed clearly, the second drawing target is also displayed so as to be viewed clearly, whereby the entire image can be displayed so as to be viewed clearly.

According to the fifteenth aspect, the blurring degree can be calculated easily in accordance with rotation amount of the virtual camera. Further, according to the sixteenth aspect, the blurring degree is set so as to increase in accordance with the increase in the rotation amount of the virtual camera. Accordingly, it is possible to set such that the more the rotation amount increases, the more easily the user can focus the first drawing target object.

These and other objects, features, aspects and advantages of the present invention will become more apparent from the following detailed description of the present invention when taken in conjunction with the accompanying drawings.

DETAILED DESCRIPTION (Overall Configuration of Game System)

Figure 1:
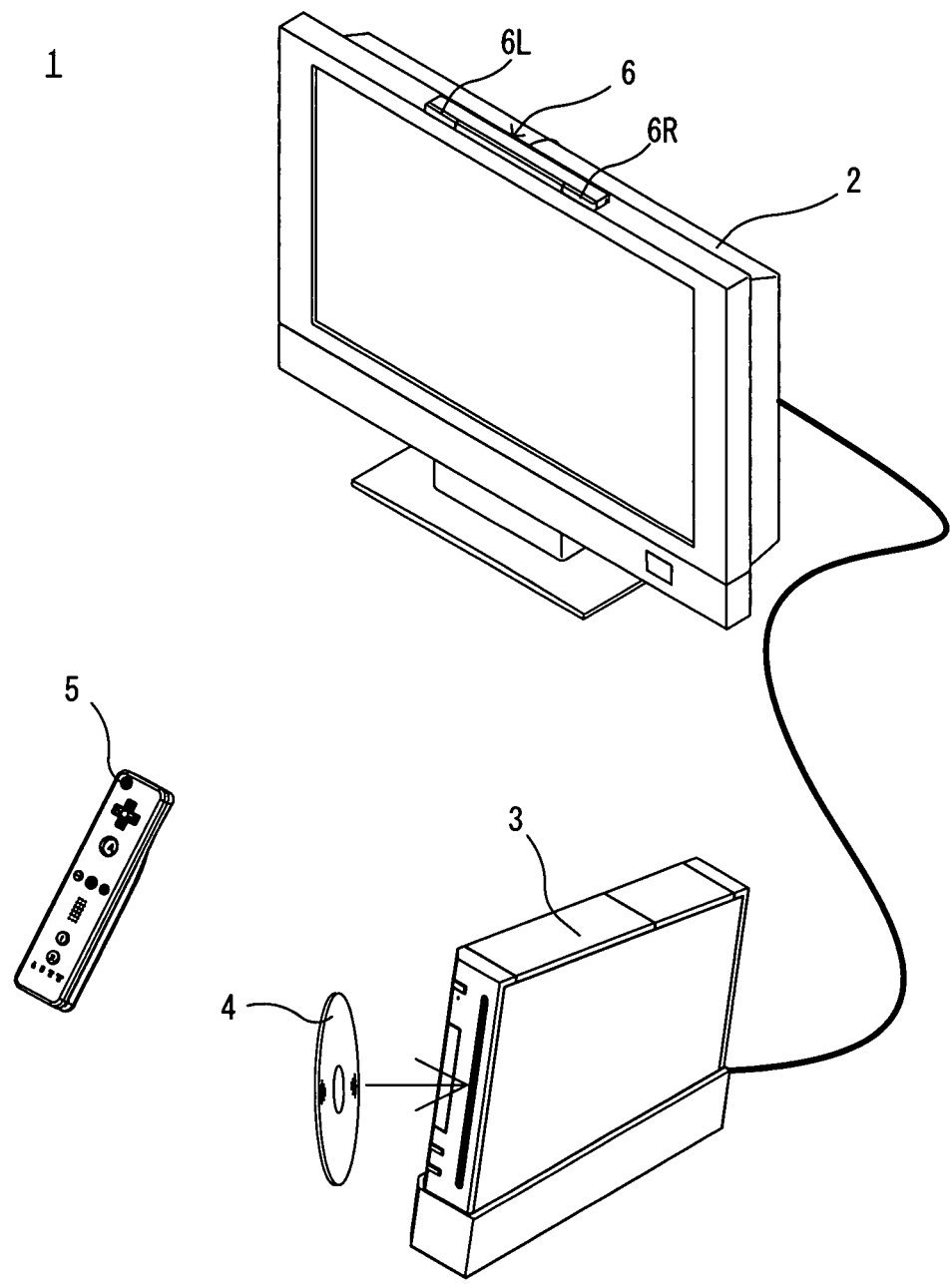
FIG. 1 is an external view of a game system 1.

With reference to FIG. 1, a game system 1 including a game apparatus, which is an exemplary image processing apparatus according to the present invention, will be described. FIG. 1 is an external view of the game system 1. Hereinafter, a game apparatus and a game program according to the present embodiment will be described by using an exemplary stationary game apparatus. As shown in FIG. 1, the game system 1 includes a television receiver (hereinafter simply referred to as a "television") 2, a game apparatus 3, an optical disc 4, a controller 5, and a marker section 6. The present system causes the game apparatus 3 to execute a game process in accordance with a game operation using the controller 5.

In the game apparatus 3, the optical disc 4, which is an exemplary data-readable information storage medium and is exchangeably used for the game apparatus 3, is detachably inserted to the game apparatus 3. On the optical disc 4, a game program executed by the game apparatus 3 (an exemplary image processing program according to the present invention) is stored. Provided on the front surface of the game apparatus 3 is a slot through which the optical disc 4 is mounted thereon. The game apparatus 3 reads and executes the game program stored on the optical disc 4 which is inserted into the slot, thereby executing a game process. The game program may be previously stored in an internal memory (which is preferably of a non-volatile type, but may be of a volatile type) of the game apparatus 3. Alternatively, the game apparatus 3 may download the game program from a predetermined server (or another game apparatus) connected via the game apparatus 3 and a network, and store the downloaded game program in the internal memory.

To the game apparatus 3, the television 2, which is an exemplary display apparatus, is connected via a connection cord. The television 2 displays a game image obtained as a result of the game process executed by the game apparatus 3. Further, in the vicinity of a screen (an upper side of the screen in the case of FIG. 1) of the television 2, the marker section 6 is situated. The marker section 6 has two markers 6R and 6L situated at both ends thereof. Specifically, the marker 6R (as well as the marker 6L) is constituted of one or more infrared LEDs, and outputs infrared light forward from the television 2. The marker section 6 is connected to the game apparatus 3, and the game apparatus 3 is capable of controlling lighting of each of the infrared LED included in the marker section 6.

The controller 5 is an input device for providing the game apparatus 3 with operation data indicative of details of an operation given thereto. The controller 5 and the game apparatus 3 are connected to each other via a wireless communication. In the present embodiment, a technique of Bluetooth (registered trademark), for example, is used for the wireless communication between the controller 5 and the game apparatus 3. Note that in another embodiment, the controller 5 and the game apparatus 3 may be configured in a communicative manner, and may be connected through a fixed line.

(Internal Configuration of Game Apparatus 3)

Figure 2:
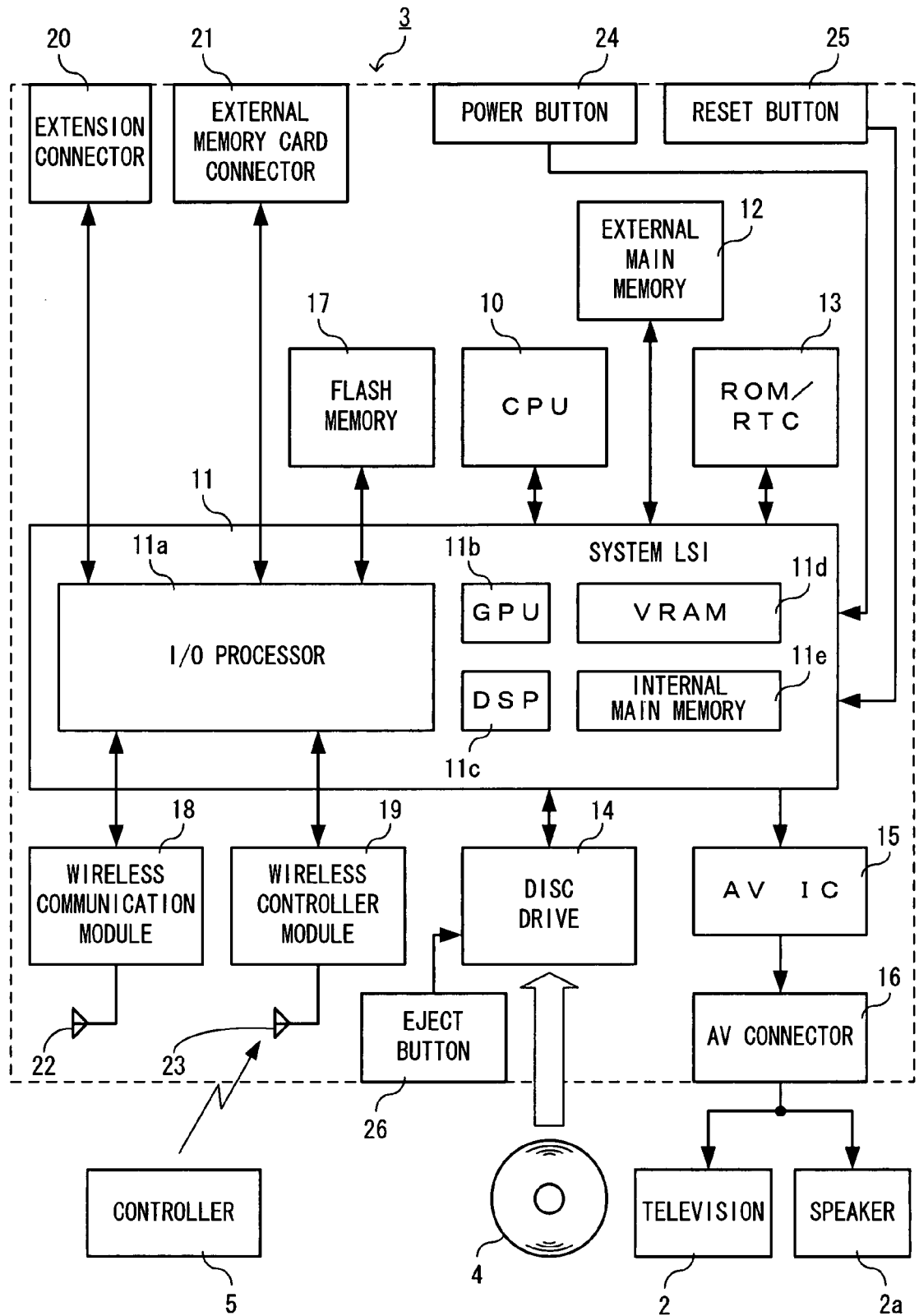
FIG. 2 is a functional block diagram of the game apparatus 3.

Next, with reference to FIG. 2, an internal configuration of the game apparatus 3 will be described. FIG. 2 is a block diagram showing a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game program stored on the optical disc 4 and then executes the game process. The CPU 10 functions as a game processor. The CPU 10 is connected to the system LSI 11. To the system LSI 11, in addition to the CPU 10, the external main memory 12, the ROM/RTC 13, the disc drive 14, and the AV-IC 15 are connected. The system LSI 11 executes processes such as control of data transfer among respective component parts connected to the system LSI 11, generation of an image to be displayed, an acquisition of data from an external apparatus, and the like. The internal configuration of the system LSI 11 will be described later. The external main memory 12, which is volatile, stores a program such as a game program read from the optical disc 4 and a game program read from the flash memory 17, and various data. The external main memory 12 is used as a work area or a buffer area for the CPU 10. The ROM/RTC 13 has a ROM (so called a boot ROM) which embeds a program for booting up the game apparatus 3, and a clock circuit (RTC: Real Time Clock) for counting time. The disc drive 14 reads program data, texture data or the like from the optical disc 4, and writes the read data into an internal main memory 11e or an external main memory 12 described later.

To the system LSI 11, provided are an I/O processor 11a, a GPU (Graphics Processor Unit) 11b, a DSP (Digital Signal Processor) 11c, a VRAM 11d, and the internal main memory 11e. Although not shown in a diagram, these component parts 11a, 11b, 11c, 11d and 11e are connected to one another via an internal bus.

The GPU 11b forms a part of drawing means, and generates an image in accordance with a graphics command given by the CPU 10. The VRAM 11d stores data (such as polygon data and texture data) which is necessary to cause the GPU 11b to execute the graphics command. In order for the image to be generated, the GPU 11b generates the image data by using the data stored in the VRAM 11d.

The DSP 11c functions as an audio processor, and generates audio data by using sound data and sound waveform (sound quality) data which are stored in the internal main memory 11e and the external main memory 12.

The image data and the audio data, which are generated as above described, are read by the AV-IC 15. The AV-IC 15 outputs the read image data to the television 2 via the AV connector 16, and also outputs the read audio data to a speaker 2a embedded in the television 2. Accordingly, an image is displayed on the television 2, and a sound is outputted from the speaker 2a.

The I/O processor 11a executes data transmission with component parts which are connected thereto, and also executes downloading of data from an external apparatus. The I/O processor 11a is connected to the flash memory 17, a wireless communication module 18, a wireless controller module 19, an extension connector 20, and a memory card connector 21. An antenna 22 is connected to the wireless communication module 18, and an antenna 23 is connected to the wireless controller module 19.

The I/O processor 11a is connected to a network via the wireless communication module 18 and the antenna 22, thereby communicating with other game apparatuses and various servers connected to the network. The I/O processor 11a periodically accesses to the flash memory 17 so as to detect data, if any, which is necessary to be transmitted to the network. When the data is detected, the data is transmitted to the network via the wireless communication module 18 and the antenna 22. Further, the I/O processor 11a receives data transmitted from other game apparatus or data downloaded from a download server via the network, the antenna 22 and the wireless communication module 18, and stores the received data in the flash memory 17. The CPU 10 executes the game program, reads the data stored in the flash memory 17, and then uses the data for the game program. In addition to data transmitted among the game apparatus 3 and the other game apparatus or the various servers, saved data (result data or intermediate step data) of a game played by using the game apparatus 3 may be stored in the flash memory 17.

The I/O processor 11a receives operation data transmitted from the controller 5 via the antenna 23 and the wireless controller module 19, and then stores (temporarily stores) the transmitted operation data in the buffer area of the internal main memory 11e or the external main memory 12.

Further, to the I/O processor 11a, the extension connector 20 and the memory card connector 21 are connected. The extension connector 20 functions as an interface such as an USB or a SCSI, and is capable of communicating with the network, as a substitute for the wireless communication module 18, by having connected thereto a medium such as an external storage medium, peripheral equipment such as other controllers, or a wired communication connector. The memory card connector 21 enables connection with an external storage medium such as a memory card. For example, the I/O processor 11a accesses the external storage medium via the extension connector 20 or the memory card connector 21, thereby storing data in the external storage medium or reading data from the external storage medium.

The game apparatus 3 includes a power button 24, a reset button 25, and an eject button 26. The power button 24 and the reset button 25 are connected to the system LSI 11. When the power button is turned on, the power is supplied to respective component parts of the game apparatus 3 via an AC adaptor, which is not shown. When the reset button 25 is pressed, the system LSI 11 reboots a boot-up program of the game apparatus 3. The eject button 26 is connected to the disc drive 14. When the eject button 26 is pressed, the optical disc 4 is dismounted from the disc drive 14.

(Configuration of Controller 5)

Figure 3:
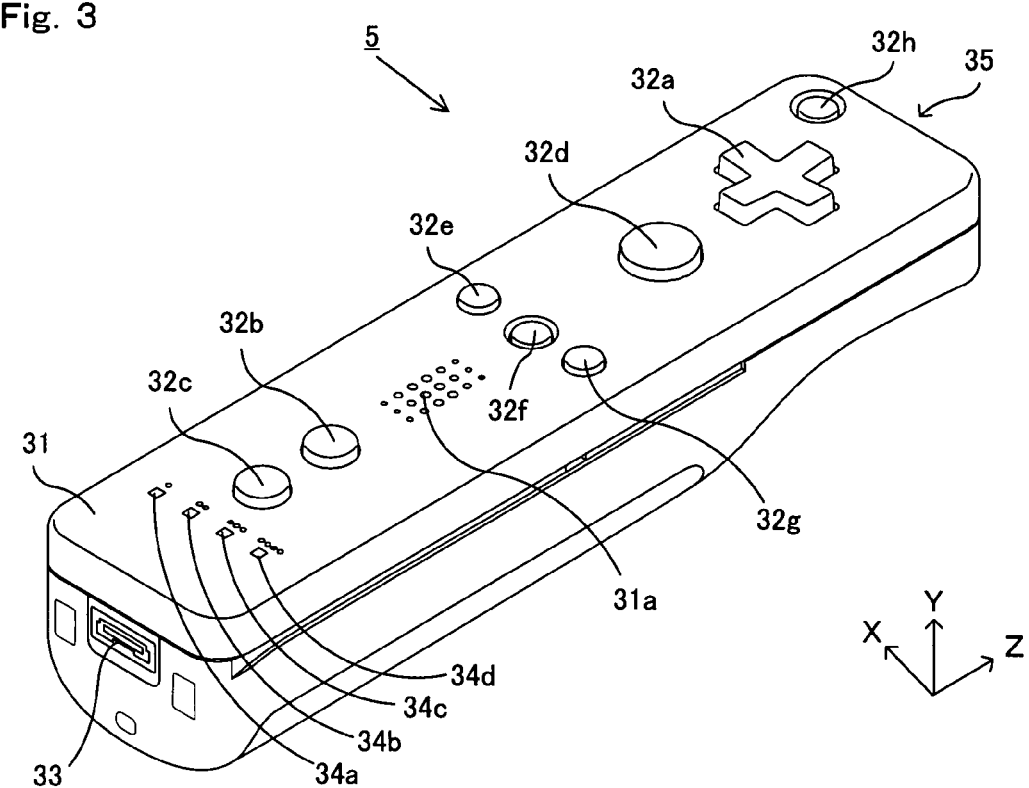
FIG. 3 is a perspective view illustrating an outer appearance of a controller 5.
Figure 4:
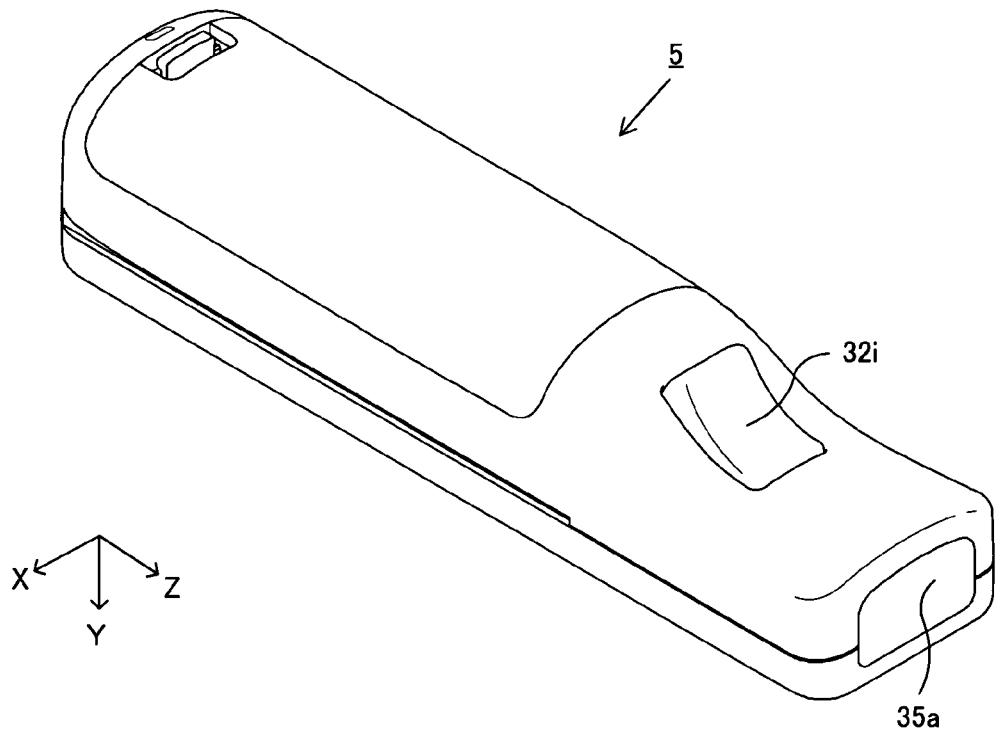
FIG. 4 is the perspective view illustrating the outer appearance of the controller 5.

Next, with reference to FIGS. 3 to 7, the controller 5 will be described. FIGS. 3 and 4 are each a perspective view illustrating an outer appearance of the controller 5. FIG. 3 is a perspective view of the controller 5 as viewed from the top rear side thereof. FIG. 4 is a perspective view of the controller as viewed from the bottom front side thereof.

As shown in FIGS. 3 and 4, the controller 5 includes a housing 31 formed by plastic molding or the like. The housing 31 has a generally parallelepiped shape extending in a longitudinal direction from front to rear (a Z axis direction shown in FIG. 3). The overall size of the housing 31 is small enough to be held by one hand of an adult or even a child. A player presses a button provided to the controller 5, or moves the controller 5 by changing a position or an attitude thereof, thereby performing a game operation.

On the housing 31, a plurality of operation buttons are provided. As shown in FIG. 3, on the top surface of the housing, provided are a cross button 32a, a first button 32b, a second button 32c, an A button 32d, a minus button 32e, a home button 32f, a plus button 32g, and a power button 32h. As shown in FIG. 4, on the bottom surface of the housing 31, a recessed portion is formed. On a slope surface at a rear surface side of the recessed portion, a B button 32i is provided. Each of the operation buttons 32a, 32b, 32c, 32d, 32e, 32f, 32g, 32h, and 32i are assigned with various functions in accordance with the game program executed by the game apparatus 3. Further, the power button 32h is a button for remotely turning on/off the power of the game apparatus 3. The home button 32f and the power button 32h each has a top surface thereof buried in the top surface of the housing 31. Accordingly, it is possible to prevent the player from pressing the home button 32f or the power button 32h inadvertently.

On a rear surface of the housing 31, a connector 33 is provided. The connector 33 is used for connecting the controller 5 to other devices (such as other controllers).

On the rear side of the top surface of the housing 31, a plurality of (four in the case of FIG. 3) LEDs 34a, 34b, 34c and 34d are provided. The controller 5 is assigned with a controller type (number) so as to be distinguishable from other main controllers. Each of the LEDs 34a, 34b, 34c and 34d is used for informing the player of the above-described controller type currently set to the controller 5, or for informing the player of the remaining battery level of the controller 5. Specifically, when the game operation is performed by using the controller 5, one of the plurality of LEDs 34a, 34b, 34c and 34d is lit depending on the above-described controller type.

Further, the controller 5 has an imaging information calculation section 35 (see FIG. 6), and on the front surface of the housing 31, a light incidence surface 35a of the imaging information calculation section 35 is provided, as shown in FIG. 4. The light incidence surface 35a is formed by a material which at least allows the infrared light from the markers 6R and 6L to pass therethrough.

Between the first button 32b and the home button 32f on the top surface of the housing 31, a sound hole 31a is formed so as to output a sound from a speaker 49 (see FIG. 5) which is embedded in the controller 5.

Next, with reference to FIGS. 5 and 6, an internal structure of the controller will be described. Each of FIGS. 5 and 6 is a diagram showing the internal structure of the controller 5.

Figure 5:
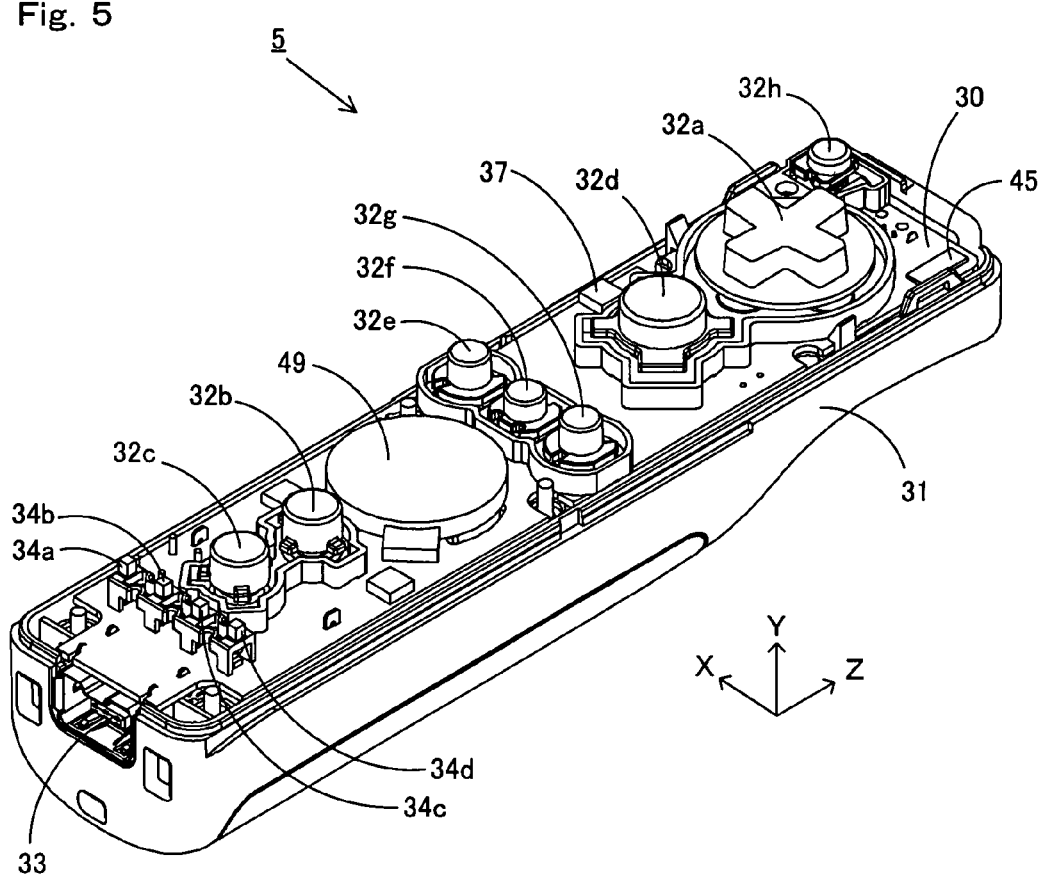
FIG. 5 is an internal structure of the controller 5.

FIG. 5 is a perspective view showing a state where an upper casing (a part of the housing 31) of the controller 5 is removed. FIG. 6 is a perspective view showing a state where a lower casing (a part of the housing 31) of the controller 5 is removed. The perspective view shown in FIG. 6 is a reverse side of a substrate 30 shown in FIG. 5.

As shown in FIG. 5, the substrate 30 is fixed inside the housing 31. On a top main surface of the substrate 30, provided are the operation buttons 32a, 32b, 32c, 32d, 32e, 32f, 32g, and 32h, the LEDs 34a, 34b, 34c, and 34d, an acceleration sensor 37, an antenna 45, the speaker 49, and the like. These elements are connected to a microcomputer 42 (see FIG. 6) via lines formed on the substrate 30 and the like. In the present embodiment, the acceleration sensor 37 is provided at a position deviated from the center of the controller 5 with respect to the X-axis direction. Accordingly, the acceleration sensor 37 can easily calculate a movement of the controller 5 when the controller 5 is rotated about the Z-axis. Further, the acceleration sensor 37 is situated at a position anterior to the center of the controller 5 with respect to the longitudinal direction (Z-axis direction). Further, a wireless module 44 (see FIG. 7) and the antenna 45 allows the controller 5 to function as a wireless controller.

Figure 6:
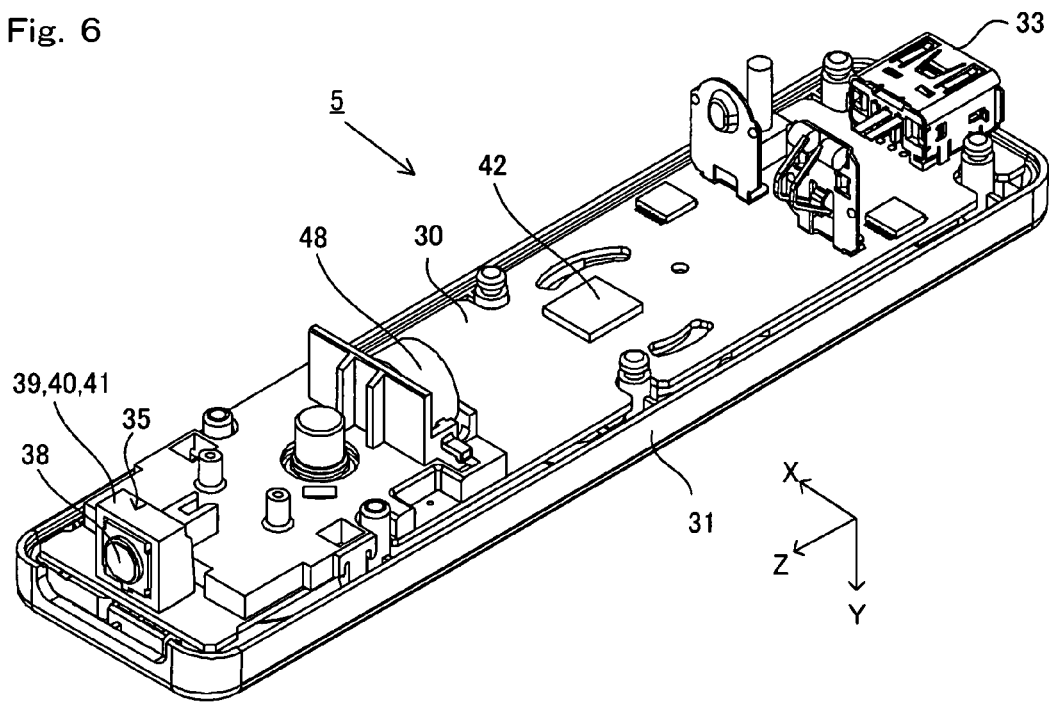
FIG. 6 is the internal structure of the controller 5.

As shown in FIG. 6, at a front edge of a bottom main surface of the substrate 30, the imaging information calculation section 35 is provided. The imaging information calculation section 3 includes an infrared filer 38, a lens 39, an image pickup element 40, and an image processing circuit 41 situated in order, respectively, from the front surface of the controller, on the bottom main surface of the substrate 30.

Further, on the bottom main surface of the substrate 30, the above-described microcomputer 42 and a vibrator 48 are provided. The vibrator 48 may be for example, a vibration motor or a solenoid, and connected to the microcomputer 42 via the line formed on the substrate 30 or the like. The vibrator 48 actuates based on an instruction given by the microcomputer 42, whereby the controller vibrates. Accordingly, the vibration is conveyed to the player's hand holding the controller, and thus, a so-called vibration-feedback game is realized. In the present embodiment, the vibrator 48 is situated at a position relatively close to a front edge of the housing 31. That is, the vibrator 48 is situated at a position close to the front edge anterior of the center of the controller 5, whereby the vibration caused by the vibrator 48 allows the entire controller 5 to vibrate largely. Further, the connector 33 is fixed at the rear edge of the bottom main surface of the substrate 30. In addition to those shown in FIGS. 5 and 6, the controller 5 includes a quartz oscillator for generating a reference clock of the microcomputer 42, an amplifier for outputting a sound signal to the speaker 49a and the like.

The shape of the controller 5 shown in each of FIGS. 3 to 6, a shape of each of the operation buttons, and the numbers, setting positions and the like of the acceleration sensor and the vibrator are merely examples. Needless to say, even when the shapes, the numbers and the setting positions and the like are different from those described in the embodiment, the present invention can be realized. Further, according to the present embodiment, the imaging direction of imaging means is a positive Z-axis direction. However, the imaging direction may be any direction. That is, the imaging information calculation section 35 (the light incidence surface 35a of the imaging information calculation section 35) in the controller 5 is not necessarily provided on the front surface of the housing 31, but may be provided on any other surface as long as light can be incident thereon from outside the housing 31.

Figure 7:
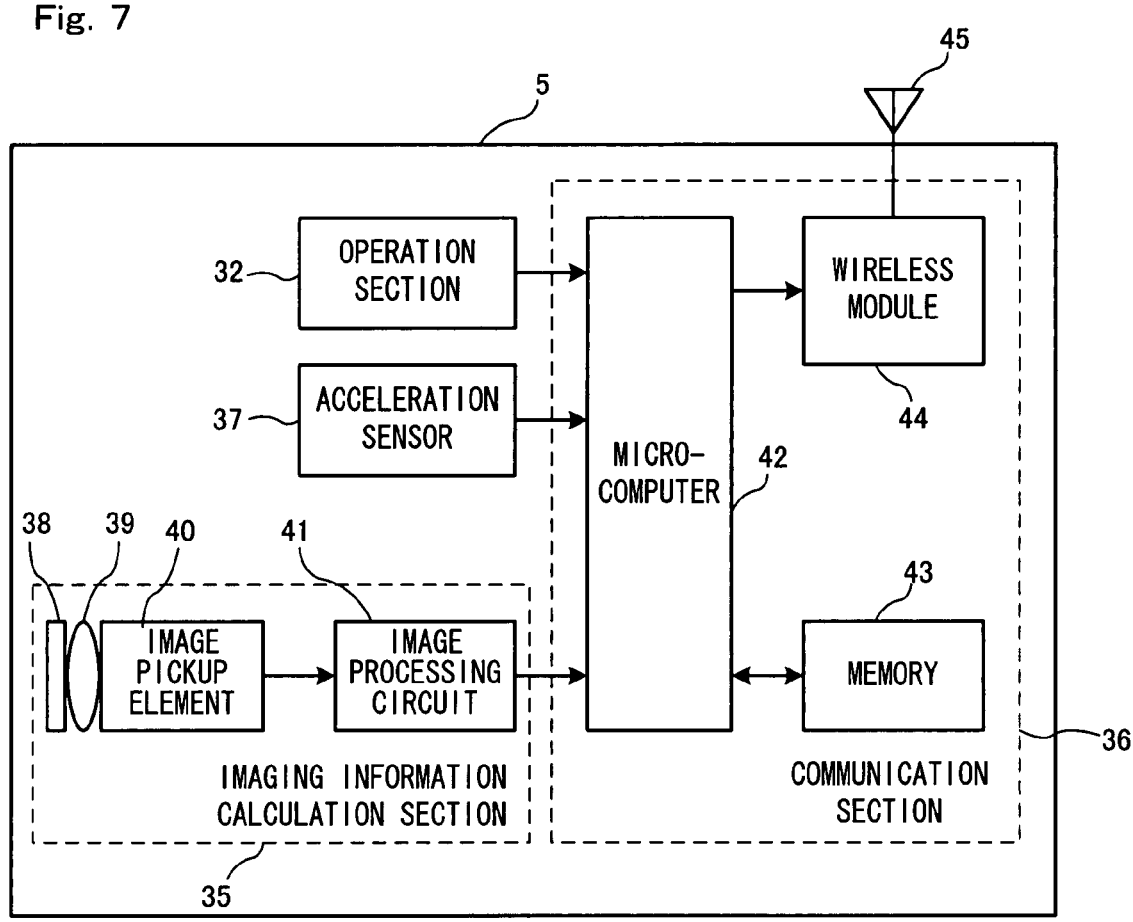
FIG. 7 is a block diagram showing a configuration of the controller 5.

FIG. 7 is a block diagram showing a configuration of the controller 5. The controller 5 includes the operation section 32 (operation buttons 32a, 32b, 32c, 32d, 32e, 32f, 32g, 32h, and 32i), the connector 33, the imaging information calculation section 35, a communication section 36, and the acceleration sensor 37. The controller 5 transmits data indicative of operation details performed thereon to the game apparatus 3 as operation data.

The operation section 32 includes the above described operation buttons 32a, 32b, 32c, 32d, 32e, 32f, 32g and 32i, and outputs operation button data indicative of a state of input to each of the operation buttons 32a, 32b, 32c, 32d, 32e, 32f, 32g and 32i (whether or not each of the operation buttons 32a, 32b, 32c, 32d, 32e, 32f, 32g and 32i is pressed) to the microcomputer 42 of the communication section 36.

The imaging information calculation section 35 is a system for analyzing the image data picked up by the imaging means, determining an area having a high brightness within the image, and calculating a position of the gravity center and a size of the area. The imaging information calculation section 35 has a maximum sampling cycle of 200 frames/sec., and thus is capable of tracking and analyzing the controller 5 even if the controller 5 moves at a relatively high speed.

The imaging information calculation section 35 includes the infrared light filter 38, the lens 39, the image pickup element 40, and the image processing circuit 41. The infrared light filter 38 allows only the infrared light to pass therethrough, among light incident on the front surface of the controller 5. The lens 39 collects the infrared light which has passed through the infrared light filter 38 and outputs the infrared light to the image pickup element 40. The image pickup element 40 is a solid-state image pickup device such as, for example, a CMOS sensor, and a CCD sensor. The image pickup element receives the infrared light collected by the lens 39, and outputs an image signal. Each of the markers 6R and 6L of the marker section 6 provided in the vicinity of the display screen of the television 2 is constituted of infrared LED which outputs the infrared light forward from the television 2. Therefore, since the infrared light filter 38 is provided, the image pickup element 40 receives only the infrared light having passed through the infrared light filter 38 and generates the image data, whereby the image pickup element 40 can pick up an image of each of the markers 6R and 6L accurately. Hereinafter, the image picked up by the image pickup element 40 is referred to as a picked up image. The image data generated by the image pickup element 40 is processed by the image processing circuit 41. The image processing circuit 41 calculates a position of an imaging target (the markers 6R and 6L) in the picked up image. The image processing circuit 41 outputs coordinates indicative of the calculated position to the microcomputer 42 of the communication section 36. The microcomputer 42 transmits the coordinate data to the game apparatus 3 as operation data. Hereinafter, the above-described coordinates are referred to as "marker coordinates". The marker coordinates change in accordance with a direction (attitude) or a position of a body of the controller 5, and thus the game apparatus 3 can calculate the direction and the position of the controller 5 by using the marker coordinates.

The acceleration sensor 37 detects an acceleration (including a gravity acceleration) of the controller 5. That is, the acceleration sensor 37 detects a force (including a gravity force) applied to the controller 5. The acceleration sensor 37 detects a value of the acceleration (linear acceleration) along a sensing axis direction, among the acceleration applied to a sensing section of the acceleration sensor 37. For example, in the case of a multiaxial (biaxial or more) acceleration sensor, an acceleration component along each of the axes is detected as the acceleration applied to the sensing section of the acceleration sensor. For example, a triaxial or biaxial acceleration sensor may be of the type available from Analog Devices, Inc., or STMicroelectronics N.V. The acceleration sensor 37 is, for example, of an electrostatic capacitance type, and an acceleration sensor of another type may be applicable.

In the present embodiment, the acceleration sensor 37 detects the linear acceleration in three directions, that is, the up-down direction (Y-axis direction shown in FIG. 3), the left-right direction (X-axis direction shown in FIG. 3), and the front-rear direction (Z-axis direction shown in FIG. 3), which are defined by using the controller 5 as a reference. The acceleration sensor 37 detects the acceleration on a straight path along each of the axial directions, and thus the acceleration sensor 37 outputs a value indicative of the linear acceleration along each of the three axis directions. That is, the detected acceleration is represented by a three-dimensional vector components (AX, AY, AZ) on a XYZ coordinate system which is defined by using the controller 5 as a reference. Hereinafter, a vector composed of respective acceleration values along the three axis directions, which are detected by the acceleration sensor 37, is referred to as an acceleration vector.

Data (acceleration data) indicative of the acceleration detected by the acceleration sensor 37 is outputted to the communication section 36. The acceleration detected by the acceleration sensor 37 changes in accordance with the direction (attitude) and the movement of the body of the controller 5, and thus the game apparatus 3 can calculate the direction and the movement of the controller 5 by using the acceleration data.

In accordance with a signal of the acceleration outputted from the acceleration sensor 37, processing is performed by a computer such as a processor (e.g., a CPU 10) of the game apparatus 3 or a processor (e.g., microcomputer 42) of the controller 5, whereby additional information relating to the controller 5 can be inferred or calculated (determined), as one skilled in the art will readily understand from the description herein. For example, in the case where computer processing is performed on the assumption that the controller 5 having the acceleration sensor 37 mounted therein is in a static state (that is, in the case where the processing is performed on the assumption that it is only the gravity acceleration that is detected by the acceleration sensor), it is possible to determine, based on the detected acceleration, whether or not the attitude of the controller 5 is tilted with respect to the gravity direction, and also possible to determine a degree of the tilt, as long as the controller 5 is actually in the static state. Specifically, when a state where a detection axis of the acceleration sensor 30 is directing toward the vertically downward direction is set as a reference, it is possible to determine whether or not the controller 5 tilts relative to the vertically downward direction, based on only whether or not 1G (the gravity acceleration) is applied in the direction of the detection axis of the acceleration sensor 37, and also possible to determine the degree of the tilt depending on magnitude of the acceleration having been detected. Further, in the case of the acceleration sensor 37 capable of detecting an acceleration in multi-axial directions, the acceleration signals having been detected in respective axes are processed so as to more specifically determine the degree to which the controller 5 tilts relative to the gravity direction. In this case, the processor may calculate, based on the output from the acceleration sensor 37, data representing an angle at which the controller 5 tilts, or calculate a direction in which the controller 5 tilts without calculating the angle of the tilt. Thus, when the acceleration sensor 37 is used in combination with the processor, the tilt or the attitude of the controller 5 can be determined.

On the other hand, in the case where it is based on the assumption that the controller 5 is in a dynamic state (a state in which the controller is being moved), the acceleration sensor 37 detects an acceleration based on the movement of the controller 5, in addition to the gravity acceleration. Therefore, when the gravity acceleration component is eliminated from the detected acceleration through a predetermined process, it is possible to determine a direction in which the controller 5 moves. Further, even when it is based on the assumption that the controller 5 is in the dynamic state, an acceleration component based on the movement of the acceleration sensor is eliminated from the detected acceleration through the predetermined process, whereby it is possible to determine the tilt of the controller 5 relative to the gravity direction. In another embodiment, the acceleration sensor 37 may include an embedded processor or another type of dedicated processor for performing predetermined processing of the acceleration signal before the acceleration signal detected by the acceleration detection mean is outputted to the microcomputer 42. The embedded or dedicated processor may convert the acceleration signal into a tilt angle (or any other preferable parameter) in the case where the acceleration sensor 37 is used for detecting a static acceleration (e.g., the gravity acceleration).

The communication section 36 includes the microcomputer 42, a memory 43, the wireless module 44, and the antenna 45. The microcomputer 42 uses the memory 43 as a storage area during processing, and controls the wireless module 44 wirelessly transmitting data obtained by the microcomputer to the game apparatus 3.

Respective data (the operation button data, marker coordinates data, and the acceleration data), which is outputted to the microcomputer 42 from the operation section 32, the imaging information calculation section 35, and the acceleration sensor 37, is temporarily stored in the memory 43. The respective data is transmitted to the game apparatus 3 as the above-described operation data. That is, at the transmission timing to the wireless controller module 19 of the game apparatus 3, microcomputer 42 outputs the operation data stored in the memory 43 to the wireless module 44. The wireless module 44 uses, for example, the Bluetooth (registered trademark) technology to modulate a carrier wave of a predetermined frequency in accordance with the operation data, and outputs a resultant weak radio signal from the antenna 45. That is, the operation data is converted by the wireless module 44 into the weak radio signal, and transmitted from the controller 5. The weak radio signal is received by the wireless controller module 19 of the game apparatus 3. The received weak radio signal is demodulated or decoded, whereby the game apparatus 3 can obtain the operation data. The CPU 10 of the game apparatus 3 performs a game process in accordance with the obtained operation data and the game program. The wireless transmission from communication section 36 to the wireless controller module 19 is sequentially performed at a predetermined cycle. Since the game process is generally performed at a cycle of 1/60 sec. (as one frame time), the wireless transmission is preferably performed at this cycle or at a cycle of a shorter time period. The communication section 36 of the controller 5 outputs respective pieces of operation data at intervals of 1/200 sec., for example, to the wireless controller module 19 of the game apparatus 3.

Using the above-described controller 5, the player can perform an operation of pointing a given position on a screen by the controller 5 and an operation of moving a body of the controller 5, in addition to a conventionally popular game operation of pressing the respective operation buttons. For example, the player can perform a game operation for moving the controller 5, and a game operation for pointing a position on the screen of the television 2 by using the controller 5.

(General Description of Processing Performed by Game Apparatus)

Figure 8:
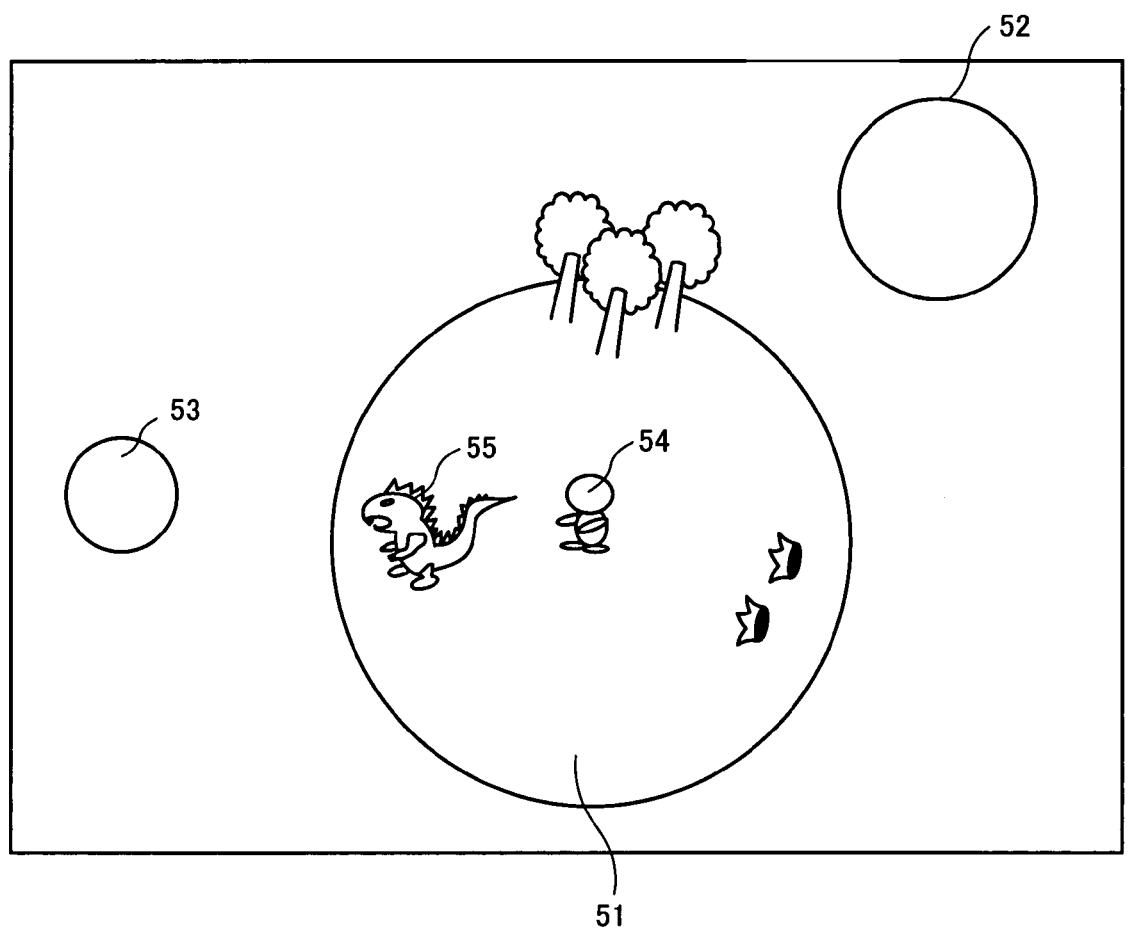
FIG. 8 is a diagram showing an exemplary game image of a game in the present embodiment.
Figure 9:
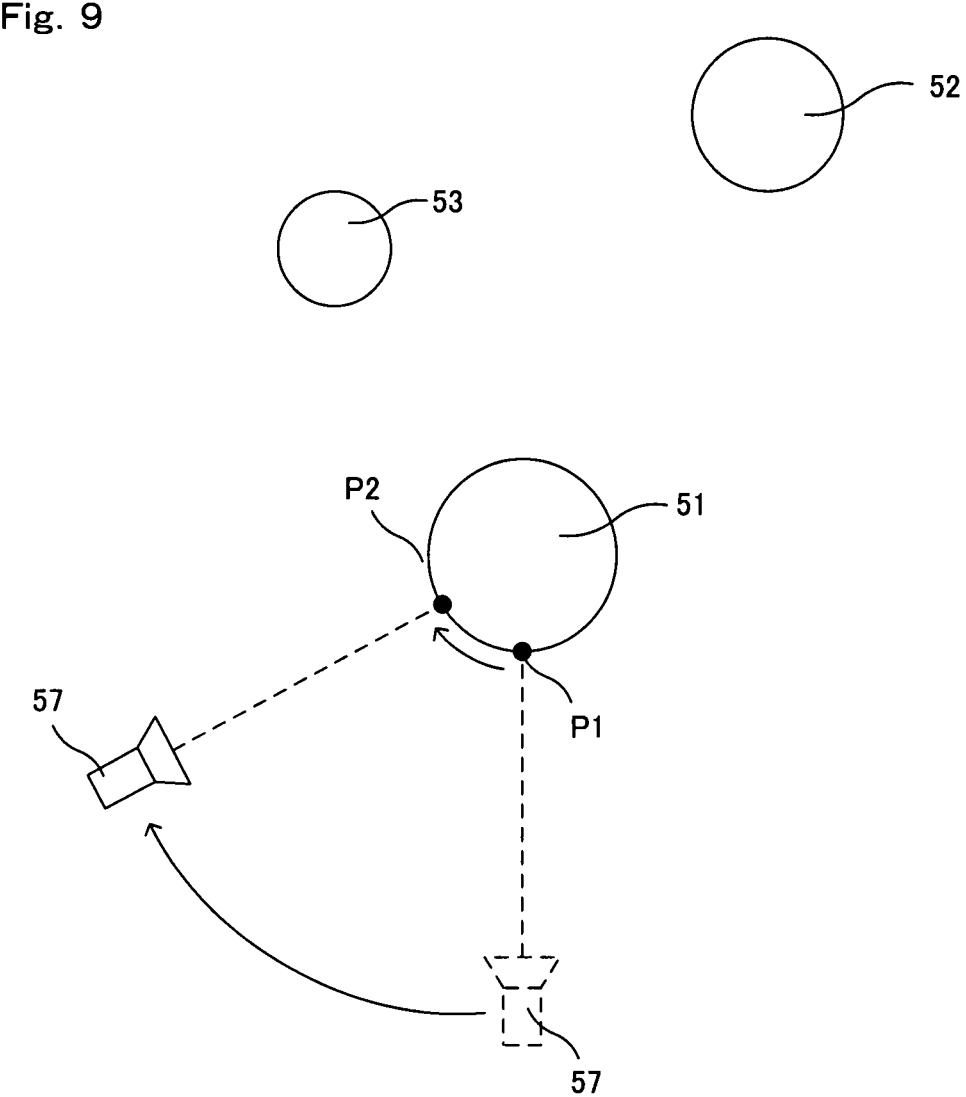
FIG. 9 is a diagram illustrating an appearance of a movement of a virtual camera.
Figure 10:
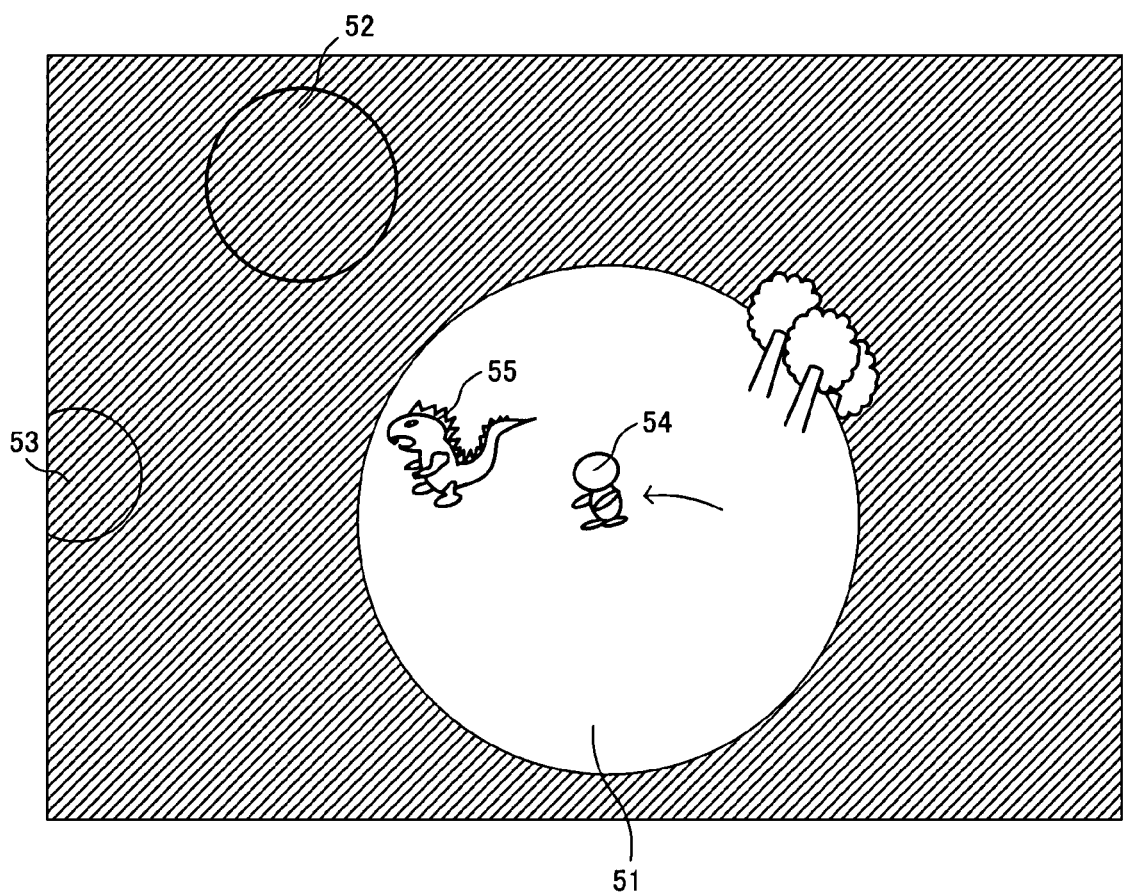
FIG. 10 is a diagram showing a reference image in the case where the virtual camera is moved from a state shown in FIG. 8.

With reference to FIGS. 8 to 10, a general description of the game process performed by the game apparatus 3 will be described. Hereinafter, an exemplary case will be described where a game process is executed by the game apparatus 3 in order for a player to play a game by operating a play character in a virtual three-dimensional space.

FIG. 8 is a diagram showing an exemplary game image of a game in the present embodiment. As shown in FIG. 8, in the present embodiment, a plurality of star objects (including a first star object 51, a second star object 52, and a third star object 53 shown in FIG. 8), a player character 54, and an enemy character (an enemy character 55 shown in FIG. 5) are allocated in a virtual three-dimensional space, which is a game space. Each of the star objects 51 to 53 is a geographic feature object fixedly allocated in the game space. Each of the star objects may be of any shape. According to FIG. 8, each of the star objects is of a spherical shape. Various objects such as the player character 54 which is an operational target of the player, and the enemy character or the like whose action is controlled by the game apparatus 3 are each allocated on any one of the star objects. The present game is aimed to accomplish a task, in which, for example, the player character 54 defeats the enemy character while moving among the respective star objects. The player character 54 may be able to move among the respective star objects, for example, by obtaining an item, or by entering a warp zone provided on each of the star objects.

In the present embodiment, as shown in FIG. 8, the game apparatus 3 generates a game image such that the player character 54 and a predetermined enemy character (e.g., the enemy character 55) are displayed. Note that the predetermined enemy character may be such an enemy character that exists in the same star as the player character 54, or may be such an enemy character that exists within a predetermined distance from the player character 54. Alternatively, the predetermined enemy character may be a previously fixed character. In other words, in the present embodiment, the position and the attitude of the virtual camera is determined based on a position of each of the player character 54 and the predetermined enemy character existing in the game space. Although details will be described later, the game apparatus 3 determines a position of a focus point of the virtual camera in accordance with the position of each of the player character 54 and the predetermined enemy character, and then determines the position and the attitude of the virtual camera in accordance with the position of the focus point.

The position and the attitude of the virtual camera are determined based on the position of the player character 54 or the like, and thus when the player character 54 or the like moves, the virtual camera also moves (the position and/or the attitude of the virtual camera changes) accordingly. FIG. 9 is a diagram showing an appearance of the movement of the virtual camera. In FIG. 9, the position of the focus point of the virtual camera changes from a point P1 to a point P2. Further, in FIG. 9, the position of the virtual camera 57 before the movement is represent by dotted lines. When the player character 54 and/or the enemy character 55 move on the first star object 51, the position of the focus point changes, and consequently, the position and the attitude of the virtual camera 57 changes. Although details will be described later, in the present embodiment, as shown in FIG. 9, the virtual camera moves round the first star object 51 while changing (rotating) a viewing direction thereof such that the direction of the first star object 51 corresponds to the viewing direction. In this manner, when the position and/or the attitude of the virtual camera change, an overall image of the three-dimensional space viewed from the virtual camera 57 changes. In other words, the game image is displayed such that first star object 51 is rotating and such that the other star objects (the second star object 52 and the third star object 53) allocated behind the first star object 51 are moving. Specifically, in the case shown in FIG. 9, the second star object 52 and the third star object 53 moves widely in the game image.

Here, in the case where an entire content of the displayed image changes due to the movement of the virtual camera, as above described, the player may not be able to identify a focusing target in the image. That is, when the virtual camera moves, a problem is caused in that it becomes difficult for the player to recognize the focusing target. This is because in the case where the entire content of the image changes when the virtual camera moves, the player will lose a point to focus in the image, and accordingly the player will lose sight of an object having focused until that time point, or will not be able to capture an object to focus while the position of the virtual camera is moving. For example, in an example of FIG. 8, the first star object 51, more specifically, the player character 54 or the enemy character 55 on the first star object 51 is assumed to be the focusing target. In the example of FIG. 8, when the virtual camera moves as shown in FIG. 9, the entire content of the image changes, and consequently, the player may lose sight of the player character 54 or the enemy character 55 on the first star object 51. Although, in the example of FIG. 8, the star object 51 and the other star objects 52 and 53 are not overlapped, there may be a case where the star object 51 and the other star objects 52 and 53 are overlapped. In such a case, it is difficult to distinguish the respective star objects from one another, and thus it is assumed that the character on the star object 51 is hardly recognized.

Therefore, in the present embodiment, the game apparatus 3 performs, during the virtual camera moving, a process of blurring the image (a blurring process) with respect to an area excluding such an area (target area) that is considered to include the player's focusing target, in a game image area. Accordingly, it becomes relatively easier for the player to view the image within the target area compared the image outside the target area. Therefore, the game apparatus 3 can naturally bring the player' focus point within the target area. Accordingly, it becomes easier for the player to capture the focusing target while the virtual camera is moving, and the player will not lose sight of the focusing target, thereby easily recognizing the focusing target.

Hereinafter, general description will be described relating to the process of blurring the image with respect to an area outside the target area. First, the game apparatus 3 generates, based on the position and the attitude of the virtual camera, an image of the game space as viewed from the virtual camera. The image is not treated with the blurring process, and is an image in which an outline of an object is drawn clearly. Hereinafter, this image is referred to as a reference image.

Next, the game apparatus determines the above-described target area in an image area of the reference image. In the present embodiment, the target area is determined, based on the position of the focus point, such that the position of the focus point of the virtual camera is included at least within the target area. Normally, the position of the focus point of the virtual camera is set at (or in the vicinity of) a position of an object, which is to be a focusing target of the player, such as the player character and the enemy character. Accordingly, the target area is set so as to include the position of the focus point, whereby a possibility will become lower that the focusing target of the player is outside the target area. In other words, in the present embodiment, the virtual camera may be controlled such that the focus point is set at or in the vicinity of the position of the object which is to be the focusing target of the player.

In the present embodiment, the target area is determined based on a depth value (Z value) set for respective pixels of the game image. Specifically, the target area is determined to be an area constituted of the pixels in which a difference between the Z value of the respective pixels and the Z value of pixels corresponding to the focus point is equal to or lower than a predetermined value. Accordingly, the target area includes pixels (pixels which display the object) corresponding to an object which exists in the vicinity of the focus point in the game space. FIG. 10 is a diagram showing a reference image in the case where the virtual camera moves from a state shown in FIG. 8. In FIG. 10, the area outside the target area is marked with diagonal lines. In an example shown in FIG. 10, the focus point is situated at a position on the star object 51, and thus a pixel area corresponding to either of the star object 51 or respective objects (the player character 54, the enemy character 55, and the like) situated thereon is the target area.

When the target area is determined, the game apparatus 3 performs the blurring process with respect to the area outside the target area in accordance with the movement of the virtual camera. In the present embodiment, the game apparatus 3 calculates a blurring degree of the image by using two variables, that is, by using a synthesis rate and a correction value. Each of the synthesis rate and the correction value is a variable indicative of the blurring degree of an image. Specifically, the synthesis rate (also called as a blending rate) is a rate of synthesizing the reference image and an image obtained by blurring the reference image (referred to as a blurred image). In the present embodiment, the synthesis rate is calculated per pixel in accordance with the Z value set to respective pixels of the reference image. Further, the correction value is a value for correcting the synthesis rate. In the blurring process, the greater the correction value is, the greater the blurring degree becomes. In the present embodiment, the correction value is calculated so as to be greater than a reference value in the case where the virtual camera moves more than a predetermined amount, whereas so as to be smaller than the reference value in the case where the virtual camera moves less than the predetermined amount. The blurring process using the synthesis rate and the correction value will be described later in detail.

Figure 11:
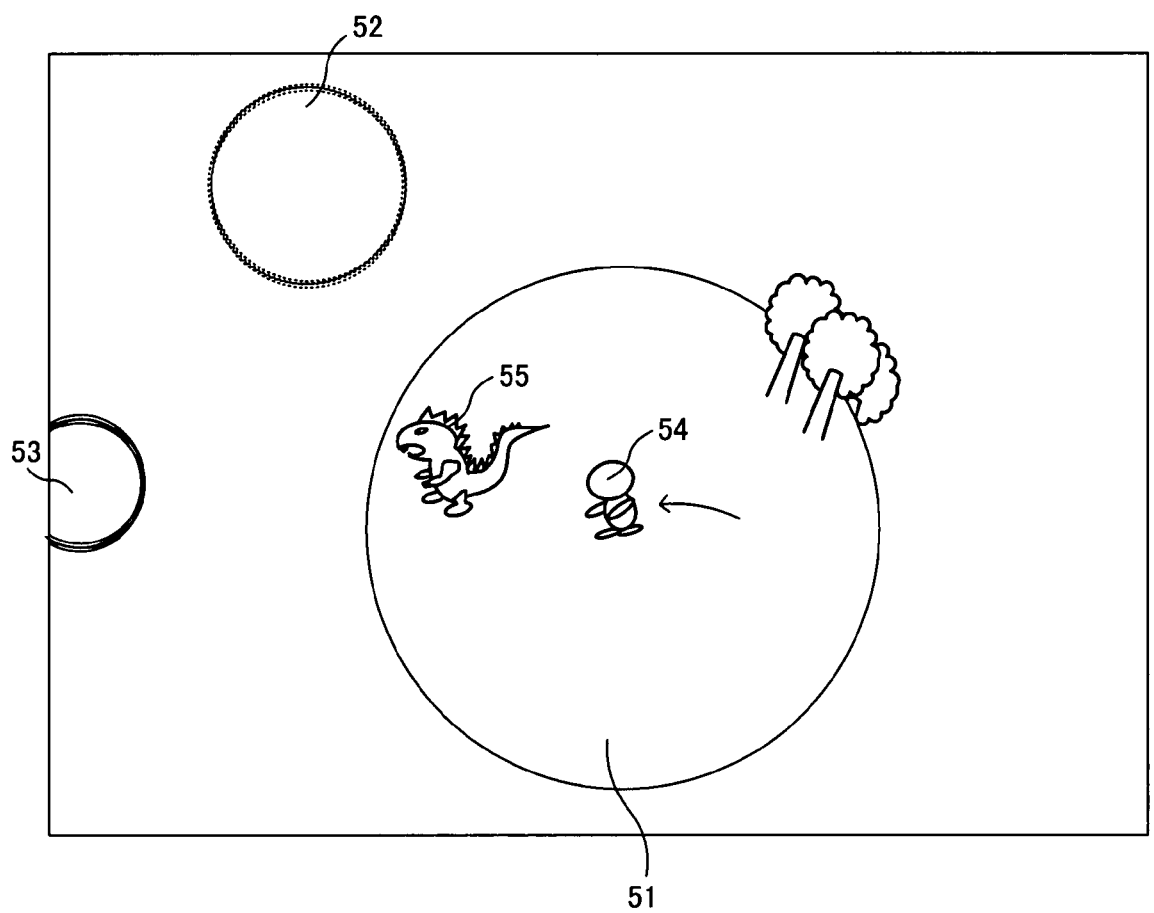
FIG. 11 is a diagram showing an exemplary game image generated during the virtual camera moving.

In the present embodiment, while the virtual camera is moving, the area outside the image area in which the first star object 51 and the objects allocated thereon are displayed is displayed in a blurred manner as a result of the above-described blurring process. FIG. 11 is a diagram showing an exemplary game image generated during the virtual camera moving. In FIG. 11, an outline of each of the object 52 and the object 53 is represented by a plurality of dotted circles, whereby an appearance of the outline being blurred is shown. As shown in FIG. 11, while the virtual camera is moving, objects within a target area, that is, the star object 51 and the objects thereon (such as the player character 54 and the enemy character 55) each has the outline displayed clearly. On the other hand, objects outside the target area (the second star object 52 and the third star object 53) each has the outline displayed in the blurred manner. Accordingly, it is relatively easier for the player to view the first star object and the objects thereon compared to the other objects, and thus the player is caused to naturally focus the first star object 51 and the like. Therefore, the player can easily capture and recognize the focusing target, without losing sight of the focusing target while the virtual camera is moving.

(Detailed Description of Game Process)

Figure 12:
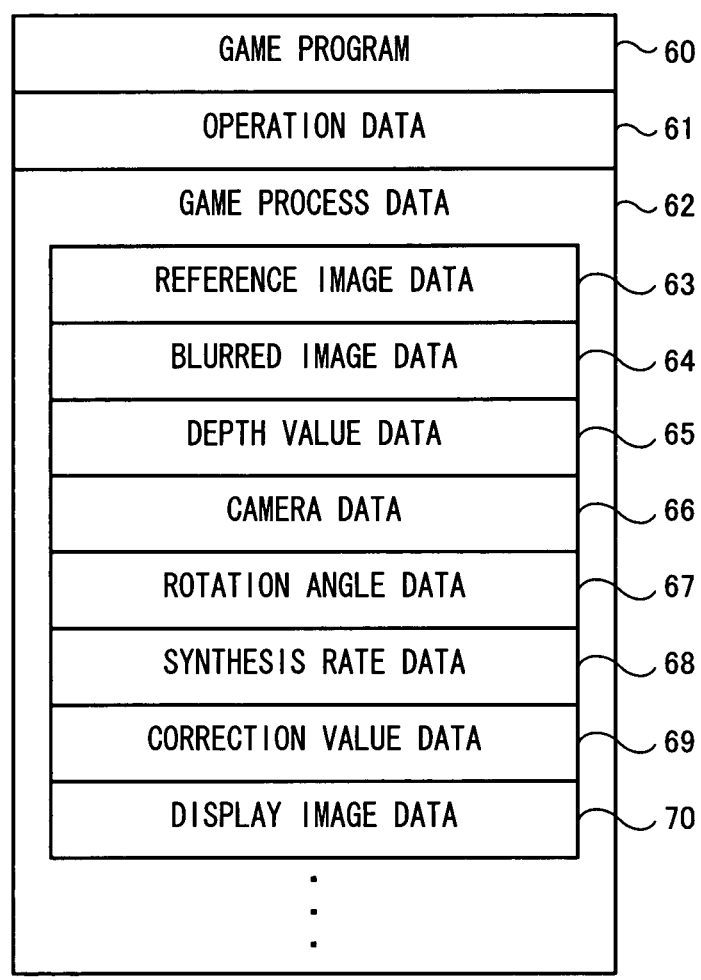
FIG. 12 is a diagram showing main data stored in a main memory of the game apparatus 3.

With reference to FIGS. 12 to 15, the game process in the present embodiment will be described in detail. FIG. 12 is a diagram showing major data stored in the main memory (the external main memory 12 or the internal main memory 11e) of the game apparatus 3. As shown in FIG. 12, in the main memory, a game program 60, operation data 61, game processing data 62 and the like are stored.

A part or all of the game program 60 is read from the optical disc 4 and then stored in the main memory at an appropriate timing after the power of the game apparatus 3 is turned on.

The operation data 61 is operation data which is transmitted from the controller 5 to the game apparatus 3. The operation data 61 includes the operation button data indicative of a state of input to each of the operation button 32a, 32b, 32c, 32d, 32e, 32f, 32g, 32h, and 32i, the marker coordinates data indicative of the marker coordinates calculated by the above-described imaging information calculation section 35, and the acceleration data indicative of the acceleration vector detected by the acceleration sensor 37. As above described, the operation data is transmitted at intervals of 1/200 sec. from the controller 5 to the game apparatus 3, and thus the operation data stored in the main memory is updated at this rate. In the main memory, only a latest (most recently obtained) piece of the operation data may be stored.

The game processing data 62 is data used for the game process (see FIG. 13) described later. The game processing data 62 includes reference image data 63, blurred image data 64, depth value data 65, camera data 66, rotation angle data 67, synthesis rate data 68, correction value data 69, and display image data 70. In addition to data shown in FIG. 12, the game processing data 62 includes data necessary for the game process such as various object (character) image data appearing in a game, and data indicative of various parameters of the objects.

The reference image data 63 is image data indicative of the above-described reference image. The reference image is, for example, obtained by performing perspective transform with respect to the three-dimensional virtual space by using the position of the virtual camera as a reference. The reference image data 63 represents a color value (RGB value) of each of the pixels of the reference image.

The blurred image data 64 represents the above-described blurred image, that is, the image data of the reference image having been blurred. Although details will be described later, the blurred image is generated based on the reference image. The blurred image data 64 represents the color value (RGB value) of respective pixels of the blurred image. The reference image data 63 and the blurred image data 64 may be stored in a frame buffer provided in the VRAM 11d.

The depth value data 65 indicates the depth value of each of the pixels of the above-described reference image. The depth value represents a depth from a viewpoint to the viewing direction of the virtual camera in the game space. In the present embodiment, the Z value calculated for each of the pixels is used as the depth value. In another embodiment, in the case where a W buffer is provided to the game apparatus 3, a value stored in the W buffer may be used as the depth value. The depth value (Z value) is calculated together with the color value of each of the pixels when the above-described reference image is generated.

The camera data is data indicative of a state of the virtual camera. Specifically, the camera data 66 represents the position and the attitude of the virtual camera in the three-dimensional space. In the present embodiment, the camera data 66 is camera matrix data used in a known three-dimensional image generation process. The camera matrix is a 4×3 matrix constituted of three-dimensional coordinate values indicative of the position of the virtual camera, and three vectors which are perpendicular to one another and indicative of the attitude of the virtual camera. That is, the attitude of the virtual camera is represented by the three vectors.

The rotation angle data 67 is data indicative of the rotation angle (a change amount of the attitude) of the virtual camera for a predetermined time period. In the present embodiment, the above-described predetermined time period is set as one frame time period (1/60 sec.), and the above-described rotation angle is calculated based on an angle formed by a direction of the virtual camera at a current frame and a direction of the virtual camera at a frame immediately prior to the current frame.

The synthesis rate data 68 is data indicative of the above-described synthesis rate. In the present embodiment, the synthesis rate is calculated per pixel in accordance with the depth value of each of the pixels of the reference image (see step S9 described later). Specifically, the synthesis rate a is within a range of $0 \leq \alpha \leq 1$. In the case of $\alpha=0$, a proportion of the blurred image constituting a synthesized image is 0% (a proportion of the reference image is 100%). In the case of $\alpha=1$, the proportion of the blurred image constituting the image after synthesis is 100% (see equation (2) described later). Therefore, the synthesis rate $\alpha$ is a value indicative of the blurring degree of an image, and in this case, the greater the value is, the greater the blurring degree of the image is.

The correction value data 69 is data indicative of the above-described correction value. Although details will be described later, the correction value is calculated in accordance with a movement amount of the virtual camera (in the present embodiment, the rotation angle of the virtual camera). Specifically, the correction value A is within a range of $0 \leq A \leq 1$, and the above-described synthesis rate is corrected by multiplying the synthesis rate by the correction value (see equation (1) described later). Therefore, the correction value A is a value indicative of the blurring degree of an image, and in this case, the greater the value is, the greater the blurring degree of the image is.

The display image data 70 is image data indicative of an image (display image) to be displayed on the television 2. That is, the display image is an image obtained as a result of the synthesis between the above-described reference image and the above-described blurred image. Specifically, the display image data 70 represents the color value (RGB value) of respective pixels of the display image. Although the details will be described later, the display image is obtained by synthesizing the reference image and the blurred image in accordance with the synthesis rate which has been corrected by the correction value.

Figure 13:
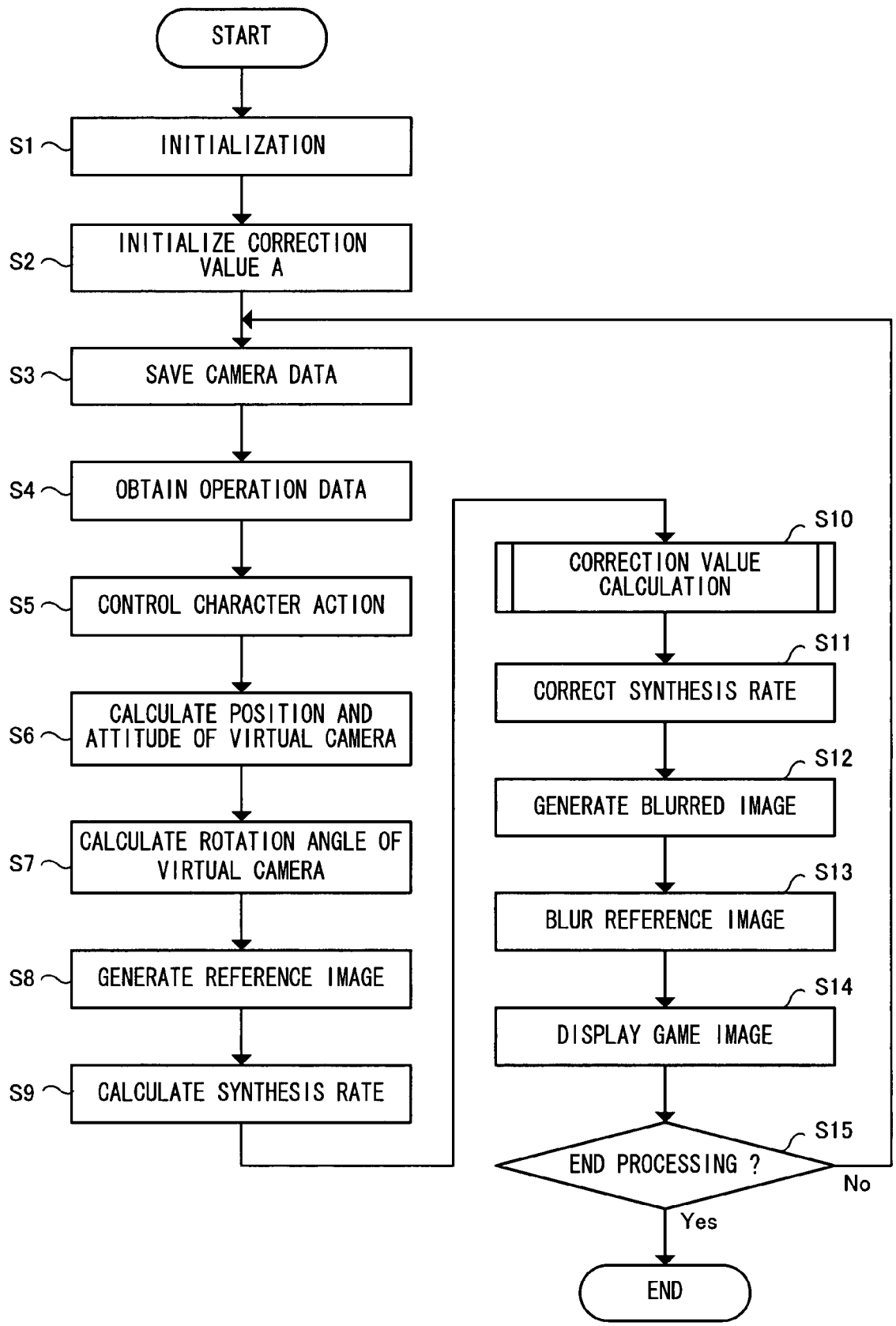
FIG. 13 is a main flowchart showing a flow of processing executed in the game apparatus 3.

Next, details of an image generation process performed in the game apparatus 3 will be described with reference to FIGS. 13 to 15. FIG. 13 is a main flowchart showing a flow of processing executed in the game apparatus 3. When the power of the game apparatus 3 is turned on, and the optical disc 4 having the game program stored therein is inserted to the game apparatus 3, the CPU 10 of the game apparatus 3 executes a boot-up program stored in a boot ROM which is not shown, whereby respective units such as the main memory are initialized. The game program stored in the optical disc 4 is then read into the main memory, and the CPU 10 starts executing the game program. The flowchart shown in FIG. 13 is a flowchart indicative of processing performed after completion of the above-described processes. Hereinafter, the processing shown in FIG. 13 will be described as being executed by the CPU 10. However, part of the processing may be executed by the CPU 10 and the GPU 11b cooperatively.

In step S1, the CPU 10 executes initialization relating to the game process. Specifically, the CPU 10 reads game character data such as the player character, geographical feature object data and the like from the optical disc 4. The CPU 10 constructs a game space by using the read data, and executes processing such as that for allocating the player character and other characters to respective initial positions in the game space. Further, in step S1, an initial position and an initial attitude of the virtual camera are determined each in a predetermined direction. That is, data indicative of the initial position and the initial attitude is stored in the main memory as the camera data 66.

In step S2 subsequent to S1, the CPU 10 initializes the correction value A. In the present embodiment, the correction value A is, for example, set to A=0. That is, the CPU 10 stores data of A=0 in the main memory as the correction value data 69.

Subsequent to above-described step S2, a processing loop from step S3 to step S15 is executed repeatedly during the game being executed. One iteration of the above-described processing loop is executed at a rate of once per frame time period (e.g., 1/60 sec.).

In step S3, the CPU 10 saves the position and the attitude of the virtual camera in a most recent frame. That is, the camera data 66 currently stored in the main memory is stored as the most recent camera data in the main memory while the camera data 66 is kept stored as it is. Subsequent to step S3, a process of step S4 is executed.

In step S4, the CPU 10 obtains the operation data. That is, the operation data transmitted from the controller 5 is received by the game apparatus 3, and stored in the main memory, whereby the CPU 10 reads the operation data 61 from the main memory. Subsequent to step S4, a process of step S5 is executed.

In step S5, the CPU 10 controls an action of each of the characters allocated on the game space. That is, the CPU 10 causes the player character to actin accordance with the player' operation of the controller 5, or the CPU 10 causes the enemy character to act in accordance with the predetermined algorithm. Specifically, the action of the player character is determined based on the operation data obtained in step S4. Further, the positions of the player character and the enemy character in the game space are calculated. Data indicative of the respective calculated positions is stored in the main memory. Subsequent to step S5, a process of step S6 is executed.

In step S6, the CPU 10 calculates the position and the attitude of the virtual camera. As above described, in the present embodiment, the position and the attitude of the virtual camera are determined in accordance with the positions of the player character and the predetermined enemy character in the game space. Hereinafter, a method of calculating the position and the attitude of the virtual camera will be described.

The CPU 10 determines the position of the focus point of the virtual camera in accordance with the positions of the player character and the enemy character. The position of the focus point is determined, for example, at a midpoint position between the position of the player character and the position of the predetermined enemy character. In order to avoid a drastic change in the focus point, the position of the focus point may be determined so as to follow the above-described midpoint position. Specifically, the focus point position may be determined at a position which is obtained by bringing a position of the focus point in a frame immediately prior to the current frame closer to the above-described midpoint position at a predetermined rate.

Next, the CPU 10 determines the position of the virtual camera in accordance with the position of the focus point. The position of the virtual camera is determined at a position a predetermined distance away from the position of the focus point in a predetermined direction. The predetermined direction is determined, for example, as a rectilinear (a half line) direction extending from the center of the spherical star object, passing through the focus point. The predetermined distance may be determined as a previously fixed length, or may be determined in accordance with the positional relation between the player character and the above-described predetermined enemy character. The predetermined distance may be, for example, determined such that the player character and the predetermined enemy character can be displayed. The position of the virtual camera is determined, whereby the viewing direction of the virtual camera is determined. That is, the viewing direction is defined as a direction from the position of the virtual camera to the focus point.

Further, the CPU 10 calculates the attitude (in the three axial directions) of the virtual camera. Since the viewing direction of the virtual camera is determined, if a tilt of rotation around the viewing direction is determined, the attitude of the virtual camera in the three axial directions can be determined. For example, the tilt is determined such that the player character is displayed on the display screen with a head thereof up and feet thereof down. Accordingly, the attitude of the virtual camera is determined. As above described, the position and the attitude of the virtual camera are calculated, whereby the virtual camera moves, as shown in FIG. 9, round the star object while facing toward the direction of the star object in accordance with the movements of the player character and the enemy character.

The data indicative of the position and the attitude of the virtual camera each calculated in step S6 is stored in the main memory as the camera data 66. Any method may be applied as a method for calculating the position and the attitude of the virtual camera. For example, the position and the attitude of the virtual camera may be calculated based on the position of the player character only. Alternatively, the position and the attitude of the virtual camera may be determined based on the player's operation.

In step S7 subsequent to step S6, the CPU 10 calculates the rotation angle of the virtual camera. The rotation angle is calculated by using the camera data 66 stored in the main memory, and the most recent camera data saved in step S3. Specifically, the rotation angle corresponding to a change in the attitude of the virtual camera, that is, from the attitude indicated by the most recent camera data to the attitude indicated by the camera data 66, is calculated. In this manner, in the present embodiment, the rotation angle is calculated by using the attitude of the virtual camera (that is, three vectors representing the attitude of the virtual camera, which are included in the camera matrix), whereby the rotation angle can be detected even when the virtual camera rotates round the viewing direction. Data indicative of the rotation angle calculated in step S7 is stored in the main memory as the rotation angle data 67.

In step S8, the CPU 10 generates the reference image. That is, in accordance with the position and the attitude of the virtual camera set in step S6, for example, by performing the perspective transform, generated is an image of the game space as viewed, in the attitude of the virtual camera, from the position of the virtual camera along the viewing direction of the virtual camera. Image data of the generated reference image is stored in the main memory as the reference image data 63. Further, in a process of generating the reference image, the CPU 10 calculates the Z value for each of the pixels of the reference image, and stores data indicative of the calculated Z value as the depth value data 65 in the main memory.

In step S9, the CPU 10 calculates the synthesis rate of each of the pixels of the reference image. The synthesis rate of each of the pixels is calculated in accordance with a depth from the position of the virtual camera to the object corresponding to the pixels, that is, in accordance with the Z value set for each of the pixels. Hereinafter, with reference to FIG. 14, a method of calculating the synthesis rate will be described.

Figure 14:
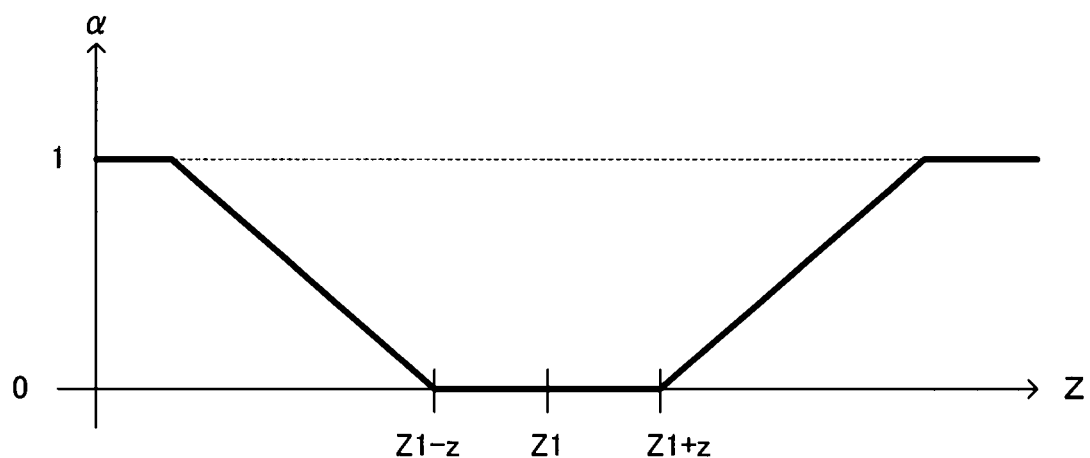
FIG. 14 is a diagram showing a relation between a Z value set for a pixel and a synthesis rate a to be set for the pixel.
Figure 15:
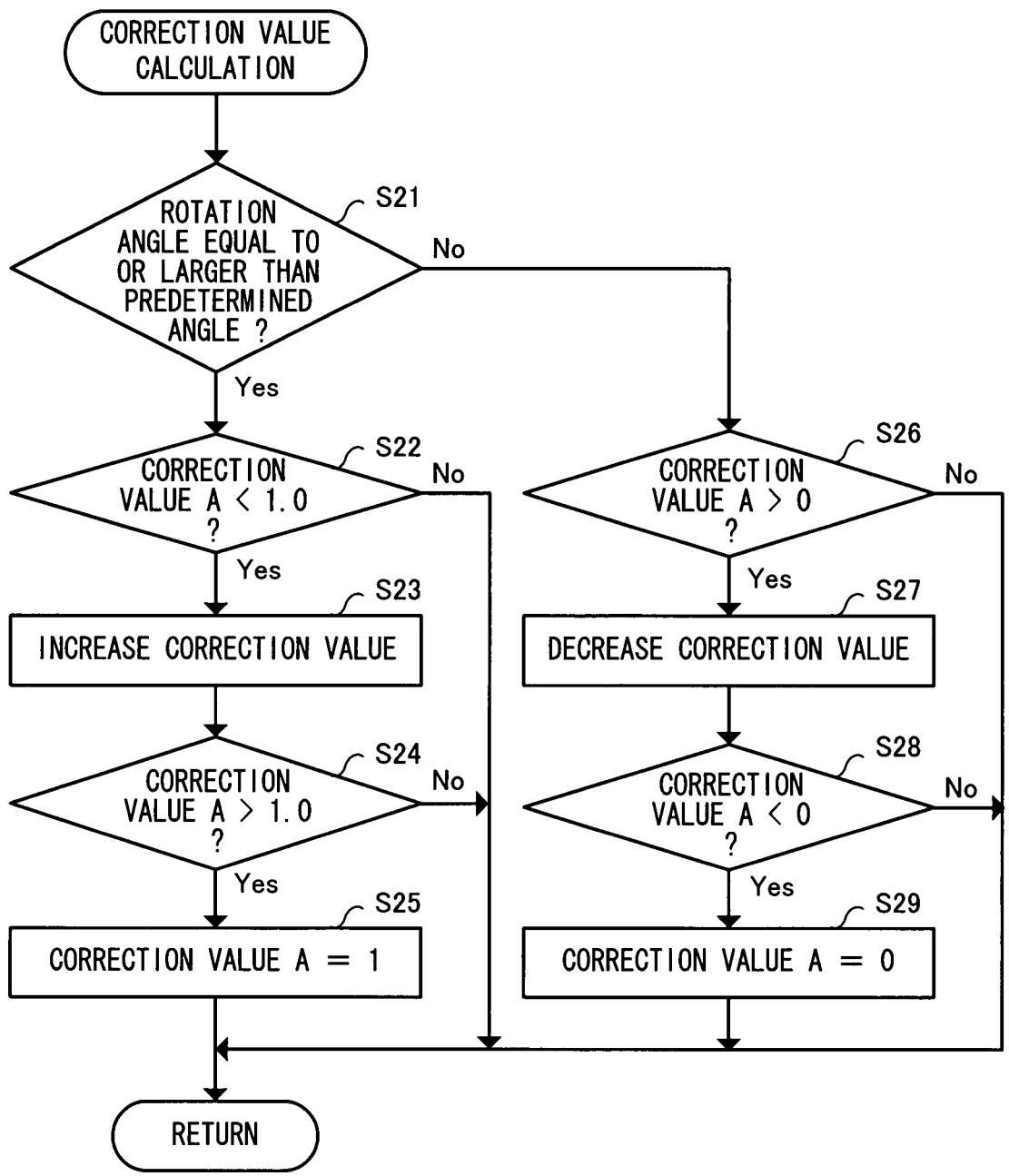
FIG. 15 is a flowchart showing a flow of a correction value calculation process (step S10) shown in FIG. 13.

FIG. 14 is a diagram showing a relation between the Z value set for each of the pixels and the synthesis rate a to be set for each of the pixels. A horizontal axis shown in FIG. 14 represents the Z value, and a vertical axis represents the synthesis rate α. Hereinafter, a distance (depth value) Z1 from the position of the virtual camera to the position of the focus point is referred to as a "reference distance". As shown in FIG. 14, with respect to pixels each having the Z value ranging within a predetermined range ($Z1-z \leq Z \leq Z1+z$) including a reference distance Z1 as the center thereof, the synthesis rate α is set α=0. In an area outside the above-described area, the synthesis rate α is set such that the value of the synthesis rate a increases up to a upper limit value of α=1, in accordance with an increase in a difference (an absolute value) between the Z value and the reference distance Z1. FIG. 14 shows that the relation between the above-described difference in the area outside the predetermined area and the synthesis rate α is a proportional relation. The relation between the above-described difference and the synthesis rate α may be a relation in which the synthesis rate α increases in accordance with the increase in the above-described difference. Further, in another embodiment, with respect to pixels of the area outside the predetermined area, the synthesis rate a may be uniformly set to "1"

In above-described step S9, the CPU 10 executes calculation of synthesis rate a with respect to each of the pixels of the reference image in accordance with the Z value. Data indicative of the synthesis rate which is calculated with respect to each of the pixels is stored in the main memory as the synthesis rate data 68.

In accordance with the process of above-described step S9, with respect to each of the pixels of the reference image, the synthesis rate is set such that the value of the synthesis rate increases in accordance with the increase in the difference between the Z value and the reference distance Z1. By using the synthesis rate a having been set in this manner, the reference image and the blurred image are synthesized together, whereby an outline is displayed clearly in a pixel area whose Z value is close to the above-described reference distance, whereas the outline is displayed in a blurred manner in a pixel area whose Z value is away from the reference distance. That is, it is possible to generate an image with respect to which focusing is performed such that an object whose depth is close to a focal distance is in focus.

In above-described step S9, in the case where a difference between the Z value of a pixel and the Z value of the focus point is equal to or lower than a predetermined value z, the synthesis rate of the pixel is set to "0". Although details will be described later, in a pixel area in which the synthesis rate α is set to "0" in above-described S9, the reference image is displayed as it is, and the image is not blurred (see step S12 described later). That is, in the present embodiment, the game apparatus 3 sets, in the process of step S9, an area having the synthesis rate of α="0" in the image area of the reference image, and then determines the set area as the above-described target area. Since the synthesis rate of α="0" is set to respective pixels corresponding to the position of the focus point, the target area is determined so as to include the position of the focus point.

In step S10, the CPU 10 executes a correction value calculation process for calculating the above-described correction value. FIG. 15 is a flowchart showing a flow of the correction value calculation process (step S10) shown in FIG. 13. In the correction value calculation process, the CPU 10 first determines, in step S21, whether or not the rotation angle of the virtual camera is equal to or greater than a predetermined angle. That is, the CPU 10 determines whether or not the rotation angle indicated by the rotation angle data 67 stored in the main memory is equal to or greater than the predetermined angle. In the case where a result of the determination in step S21 is positive, a process of step S22 is executed. On the other hand, the result of the determination in step S21 is negative, a process of step S26 to be described later is executed.

In steps S22 to S25, a process of increasing the correction value by a predetermined value is performed. On the other hand, in steps S26 to S29, a process of decreasing the correction value by a predetermined value is performed. That is, in the present embodiment, in the case where the rotation angle of the virtual camera is equal to or greater than the above-described predetermined angle, the correction value is increased from the current value. In the case where the rotation angle of the virtual camera is smaller than the above-described predetermined value, the correction value is decreased from the current value. Hereinafter, steps S22 to S29 will be described in detail.

In step S22, the CPU 10 determines whether or not the correction value A is smaller than the upper limit value of "1". Step S22 is a process for determining whether or not the correction value is yet to reach the upper limit value (whether or not the correction value can be increased). In the case where a result of the determination in step S22 is positive, a process of step S23 is executed. On the other hand, the result of the determination in step S22 is negative, the CPU 10 ends the correction value calculation process. In this case, the correction value has already reached the upper limit value, and the correction value cannot be increased.

In step S23, the CPU 10 increases the correction value by the predetermined value. The predetermined value may be set any value within a range greater than 0 and equal to or lower than 1. For example, in the case where the predetermined value is set to "1/60(≈0.0167)", when a state, in which the rotation angle of the virtual camera is equal to or greater than the above-described predetermined angle, continues for 60 frame time periods (=1 sec.), the correction value A reaches the upper limit value (A=1). In step S23, when the correction value is increased, data indicative of the increased correction value is stored in the main memory as new correction value data 69. Subsequent to step S23, a process of step S24 is executed.

In step S24, the CPU 10 determines whether or not the correction value A is greater than the upper limit value of "1". The correction value, which is a target of the determination in this step, is a correction value after having the value increased in step S23. In the case where a result of the determination in step S24 is positive, a process of step S25 is executed. On the other hand, the result of the determination in step S24 is negative, the CPU 10 ends the correction value calculation process.

In step S25, the CPU 10 sets the correction value to the upper limit value of "1". That is, data indicative of "1" is stored in the main memory as new correction value data 69. When the correction value is increased in above-described step S23, there may be a case where the increased correction value exceeds "1" depending on the magnitude of the predetermined value. The process in each of above described steps S24 and S25 corrects the correction value so as to be equal to the upper limit value in the case where the increased correction value exceeds the upper limit value of "1". Subsequent to step S25, the CPU 10 ends the correction value calculation process.

On the other hand, in step S26, the CPU 10 determines whether or not the correction value A is greater than the lower limit value of "0". Step S26 is a process for determining whether or not the correction value is yet to reach the lower limit value (whether or not the correction value can be decreased). In the case where a result of the determination in step S26 is positive, a process of step S27 is executed. On the other hand, the result of the determination in step S26 is negative, the CPU 10 ends the correction value calculation process. In this case, the correction value has already reached the lower limit value, and the correction value cannot be decreased.

In step S27, the CPU 10 decreases the correction value by a predetermined value. The predetermined value may be equal to the predetermined value used for increasing the correction value, or may be different therefrom. In step S27, when the correction value is decreased, data indicative of the decreased correction value is stored in the main memory as new correction value data 69. Subsequent to step S27, a process of step S28 is executed.

In step S28, the CPU 10 determines whether or not the correction value A is lower than the lower limit value of "0". The correction value, which is a target of the determination in this step, is a correction value after having the value decreased in step S27. In the case where a result of the determination in step S28 is positive, a process of step S29 is executed. On the other hand, in the case where the result of the determination in step S28 is negative, the CPU 10 ends the correction value calculation process.

In step S29, the CPU 10 sets the correction value to the lower limit value of "0". That is, data indicative of "0" is stored in the main memory as new correction value data 69. When the correction value is decreased in above-described step S27, there may be a case where the decreased correction value falls below "0" depending on the magnitude of the predetermined value. The process of each of above-described steps S28 and S29 corrects the correction value so as to be equal to the lower limit value, in the case where the decreased correction value falls below the lower limit value of "0". Subsequent to step S29, the CPU 10 ends the correction value calculation process.

As above described, in the correction value calculation processing, when a state in which the rotation angle of the virtual camera is equal to or greater than the predetermined value continues, the correction value gradually increases up to the upper limit value of "1". On the other hand, when a state in which the rotation angle of the virtual camera is smaller than the predetermined value continues, the correction value gradually decreases toward the lower limit value of "0". Therefore, according to the above-described correction value calculation process, even if the virtual camera is drastically rotated from a resting state, the correction value will not be increased drastically. Further, even if the virtual camera is suddenly stopped from a rotating state, the correction value will not suddenly become "0". In this manner, in the present embodiment, responsiveness to the rotation of the virtual camera, which is represented by a change in the correction value, is reduced, whereby it is possible to prevent the game image from suddenly becoming blurred, or conversely, from suddenly becoming clear. Accordingly, it is possible to prevent the player from having an uncomfortable feeling.

In another embodiment, the game apparatus 3 may calculate the correction value such that magnitude of the correction value corresponds to the magnitude of the rotation angle of the virtual camera. That is, in the case where the rotation angle is equal to or greater than the predetermined value, the game apparatus 3 may calculate the correction value so as to be greater than the previously fixed reference value. On the other hand, in the case where the rotation angle is smaller than the predetermined value, the game apparatus 3 may calculate the correction value so as to be smaller than the reference value. In this case, the correction value is not necessarily expressed by two values, that is, a first value which is greater than the reference value, and a second value which is smaller than the reference value. For example, the correction value may be calculated so as to be proportional to the magnitude of the rotation angle.

Returning to description of FIG. 13, in step S11 subsequent to step S10, the CPU 10 corrects the synthesis rate a calculated in step S9 by using the correction value A calculated in step S10. The processing in step S11 is performed by using the synthesis rate data 68 and the correction value data 69 which are stored in the main memory. Specifically, the CPU 10 corrects the synthesis rate a of each of the pixels indicated by the synthesis rate data 68 by using the correction value A indicated by the correction value data 69 in accordance with equation (1) described below.

$$\alpha = \alpha' \times A \quad (1)$$

In equation (1), a variable α' is a synthesis rate before correction, and a variable α is a synthesis rate after correction. The CPU 10 corrects the synthesis rate set for each of the pixels by using a common correction value, and stores data indicative of the corrected synthesis rate in the main memory as new synthesis rate data 68. The corrected synthesis rate, which is processed in step S11, represents the blurring degree of the image (display image) finally displayed on the screen. Details thereof will be described later. That is, the process of step S11 determines the blurring degree of the display image in accordance with the synthesis rate α and the correction value A.

As above described, the synthesis rate set for the respective pixels within the target area in the whole area of the reference image is "0". Therefore, the corrected synthesis rate for the respective pixels is "0" regardless of the magnitude of the correction value. Accordingly, the synthesis rate does not change in accordance with the correction process in step S11 with respect to these pixels, and thus the correction process may be performed, in step S11, at least with respect to the pixels in the area outside the target area. Accordingly, correction process with respect to the pixels within the target area may be omitted.

In step S12 subsequent to S11, the CPU 10 generates the blurred image by using the reference image. Any method may be applied as a method for generating the blurred image. However, in the present embodiment, the CPU 10, for example, downscales the reference image, and draws an image by overlapping copies of the downscaled reference image a plurality of times while displacing the same by predetermined pixels. The CPU 10 then enlarges the drawn image thereby obtaining the blurred image. Further, in another embodiment, the blurred image may be generated by smoothing the color value of each of the pixels of the reference image by using, for example, a Gaussian filter. Alternatively, the blurred image may be generated based on a method of roughening the outline of the reference image by once enlarging and then downscaling the reference image. Alternatively, the blurred image may be generated by performing bilinear filtering or trilinear filtering with respect to the reference image. Image data of the blurred image generated in step S12 is stored in the main memory as the blurred image data 64.

In step S13 subsequent to S12, the CPU 10 generates the display image by executing the blurring process for blurring the reference image. The blurring process is performed by synthesizing the reference image and the blurred image in accordance with the corrected synthesis rate α. Specifically, with reference to the reference image data 63, the blurred image data 64 and the synthesis rate data 68, the CPU 10 calculates a color value C of the respective pixels of the display image in accordance with equation (2) described below.

$$C=C1\times(1-\alpha)+C2\times\alpha \quad (2)$$

In equation (2), a variable C1 represents the color value of the reference image, and a variable C2 represents a color value of the blurred image. The CPU 10 calculates the color value of the respective of the display image by performing a calculation using equation (2) with respect to the respective pixels of the display image. The image data of the display image which is generated by the process of step S13 is stored in the main memory as the display image data 70.

In the process of above-described step S13, the synthesis rate a in the above-described target area is "0", and thus the reference image is reflected on the display image as it is. Accordingly, the image is not blurred. That is, the blurring process is not performed with respect to the target area. On the other hand, in the area outside the target area, since the synthesis rate α is not "0", the blurred image is reflected on the display image. That is, in the area outside the target area, the blurred process is performed, and an image having a blurred outline is displayed.

In another embodiment, in the correction value calculation process of step S10, in the case where the correction value A is calculated as A=0, the process of each of the above-described steps S11 to S13 may be skipped. Further in this case, in step S14, the CPU 10 displays the reference image as it is on the television 2. Accordingly, a process in the case where the correction value A is calculated as A=0 can be simplified.

In step S14 subsequent to step S13, the CPU 10 displays the display image generated in step S13 on the television 2. That is, the display image data 70 stored in the main memory is written in the frame buffer provided to the VRAM 11*d*. Accordingly, the display image is displayed on the television 2. Although there may be a case where another image (such as a score, and an image indicative of information relating to the player character) is displayed so as to be overlapped on the display image. Such an image is not necessarily displayed in a blurred manner. Subsequent to step S14, the process of step S15 is executed.

In step S15, the CPU 10 determines whether or not to end the game process. This determination process is performed based on, for example, whether or not a game is cleared, whether or not the game is over, or whether or not the player gives an instruction to stop the game. In the case where a result of the determination in step S15 is negative, the process of step S3 is executed again. Thereafter, the process of each of steps S3 to S15 is executed repeatedly until the game is determined to end in the determination process of step S15. On the other hand, when the result of the determination in step S15 is positive, the CPU 10 ends the game process shown in FIG. 13. That is all for the description of the game process.

As above described, according to the present embodiment, in the case where the virtual camera rotates, the blurring process is performed with respect to the pixel area outside the target area. Accordingly, even if the entire image has changed due to the rotation of the virtual camera, it is possible to cause the player to focus within the target area. Accordingly, it is possible to cause the player to easily recognize the focusing target in the target area.

In the above-described embodiment, the position of the focus point of the virtual camera is determined based on the positions of the player character and the predetermined enemy character. In another embodiment, the position of the focus point may be determined only based on the focusing target of the player and the position of a predetermined object to be expected. For example, the position of the focus point may be determined at the position of the predetermined object to be expected or in the vicinity thereof.

In the above-described embodiment, the target area is determined based on the depth value (Z value) set for the respective pixels. The method for determining the target area is not limited to that described above. The target area may be determined so as to include pixels corresponding to a predetermined position in the viewing direction of the virtual camera. For example, in another embodiment, the game apparatus 3 sets the above-described predetermined position as the position of the focus point of the virtual camera, and determines, as the target area, the pixel area including pixels corresponding to the position of the focus point and pixels within a predetermined distance from the pixels corresponding the position of the focus point. For example, in step S9 of the above-described game process, the synthesis rate a may be set as α=0, with respect to the pixels corresponding to the position of the focus point and the pixels within the predetermined distance from the pixels corresponding to the position of the focus point. In this case, the synthesis rate a for pixels in an area outside the predetermined distance from the pixels corresponding to the position of the focus point is set to a value other than 0. Further, in another embodiment, the game apparatus 3 may determine an area, which at least includes pixels corresponding to an object to which the focus point is set, as the target area.

Further, in another embodiment, the target area is not necessarily determined in accordance with the position of the focus point. For example, in the case where the virtual camera moves so as to rotate round a predetermined position while facing the predetermined position, the target area may be determined in accordance with the predetermined position. Specifically, an area including pixels corresponding to an object existing in a predetermined space which includes the predetermined position may be set as the target area. For example, in the above-described embodiment, a position of a rotation center of the virtual camera corresponds to a central position of the star object, and thus the above-described predetermined space (the predetermined space including the central position of the star object) may be regarded as a space including the star object and the objects on the star objects. More specifically, the above-described space may be determined in a space within a predetermined distance from the position of the rotation center of the virtual camera, or may be determined such that the difference between the depth value of the rotation center of the virtual camera and that of the above-described space is equal to or lower than the predetermined value. Accordingly, in the same manner as the above-described embodiment, the area including those pixels which correspond to the star object and the objects on the star object corresponds to the target area, and thus it is possible to generate an image in which the star object and the objects on the star objects are not blurred, whereas the other objects are blurred.

In the above-described embodiment, the game apparatus 3 uses two variables, i.e., the synthesis rate and the correction value, as the variables indicative of the degree of blurring the reference image. In another embodiment, the game apparatus 3 may perform the blurring process by using only a variable (the correction value in the above-described embodiment) whose value changes depending on the movement amount of the virtual camera. For example, in another embodiment, the game apparatus 3 may use the above-described correction value A as the synthesis rate, and generate the display image by synthesizing the reference image and the blurred image at a rate based on the correction value A. In this case, the game apparatus 3 need not execute the process of calculating the synthesis rate as performed in the above-described embodiment (step S9).

Further, although the game apparatus 3 changes the blurring degree of the reference image depending on the movement of the virtual camera, the blurring process is not necessarily suspended when the virtual camera is in the resting state. In this case, the blurring process may be performed, or may be suspended. For example, in the above-described embodiment, immediately after the rotation of the virtual camera stops, the correction value A does not become "0". Therefore, the blurring process is performed. In another embodiment, the lower limit value of the correction value A in the above-described embodiment may be set equal to or greater than 0. In this case, the blurring process is executed even if the virtual camera is in the resting state (depending on the Z value of the respective pixels).

In the above-described embodiment, the game apparatus 3 uses the rotation angle of the virtual camera as the movement amount of the virtual camera, and changes the blurring degree of the reference image depending on the amount of the movement. In another embodiment, a moving distance (an amount of positional change) of the virtual camera may be used as the movement amount of the virtual camera. Alternatively, both of the moving distance and the rotation angle of the virtual camera may be used as the movement amount of the virtual camera. This is because, in the case where the attitude of the virtual camera changes, or in the case where the position of the virtual camera changes, a problem in which the player hardly captures the focusing target is caused by changing of the entire image.

In the above embodiment, although an exemplary case where the present invention is applied to the game apparatus and the game program is described, the present invention is not limited to the application to a game. The present invention is applicable to an image processing apparatus operable to display a virtual space on a display apparatus, or an image processing program executed by a computer of the image processing apparatus.

As above described, the present invention is designed to allow a user, for example, to easily recognize a target to be focused even in the case where the position of the viewpoint or the viewing direction of the virtual camera changes in the three-dimensional space. The present invention may be used as a game program or a game apparatus, for example.

While the invention has been described in detail, the foregoing description is in all aspects illustrative and not restrictive. It is understood that numerous other modifications and variations can be devised without departing from the scope of the invention.

The invention claimed is:

1. A non-transitory computer readable storage medium having stored thereon an image processing program causing a computer to execute a process of generating an image viewed from a virtual camera situated in a virtual space, the image processing program causing the computer to execute:
rotating the virtual camera;
comparing the amount of rotation of the virtual camera per unit time to a nonzero threshold amount; and
in the case where the comparison reveals a rotation amount of the virtual camera per unit time exceeds the non-zero threshold amount, drawing a first drawing target object included in a first area which includes a center of rotation of the virtual camera, drawing a second drawing target object included in a second area, which surrounds the first area, so as to be a blurred image compared to the first drawing target object, and generating a screenful of a display image based on the virtual camera structured to focus the user within the first viewing area even in the case where the screenful of the display image changes due to rotation of the virtual camera about the center of rotation,
wherein in the case where the rotation amount of the virtual camera per unit time does not exceed the threshold amount, the computer draws the second drawing target object so as to be a less blurred image compared to the second drawing target object which is drawn in the case where the rotation amount of the virtual camera per unit time exceeds the threshold amount.

2. The non-transitory storage medium according to claim 1 wherein the image processing program further causes the computer to execute changing a blurring degree of the second drawing target object in accordance with the rotation amount.

3. The non-transitory storage medium according to claim 2 wherein, the computer changes the blurring degree so as to increase the blurring degree in accordance with an increase of the rotation amount, and to decrease the blurring degree in accordance with a decrease of the rotation amount.

4. An image processing apparatus for displaying an image of a virtual space on a display apparatus, the image processing apparatus comprising:
a processor; and
a memory coupled to said processor, said memory storing instructions that, when executed by said processor, control said processor to:
generate, as a reference image, the image of a virtual space viewed from a virtual camera which is set within the virtual space,
determine, in the reference image, a predetermined area which includes pixels corresponding to a predetermined position in a viewing direction of the virtual camera;
set a predetermined non-zero movement threshold amount;
compare a movement amount of the virtual camera with the predetermined movement amount; and
blur an area outside the predetermined area in the reference image on the basis of a blurring degree obtained in accordance with the following amounts: a depth value of said pixels, and the comparison of movement amount of the virtual camera with the predetermined movement amount such that the blurring degree increases in accordance with an increase in a parameter related to the movement amount, and the parameter has been set to be greater than a reference value in the case where the comparison reveals the movement amount is greater than the predetermined threshold amount, and to be smaller than the reference value in the case where the comparison reveals the movement amount of the virtual camera is smaller than the predetermined threshold amount; and
display an image including the blurred area on the display apparatus.

5. A system for displaying an image of a virtual space on a display apparatus, the system comprising:
a processing system including one or more processors; and
a memory coupled to said processing system, said memory storing instructions that, when executed by said processing system, control said processing system to:
generate an image of a virtual space viewed from a virtual camera which is set within the virtual space as a reference image, determine, in the reference image, a predetermined area which includes pixels corresponding to a predetermined position in a viewing direction of the virtual camera;
set a predetermined non-zero movement threshold amount;

compare a movement amount of the virtual camera with the predetermined movement amount; and blur an area outside the predetermined area in the reference image on the basis of a blurring degree obtained in accordance with the following amounts: a depth value of the pixels, and the comparison of movement amount of the virtual camera with the predetermined movement amount such that the blurring degree increases in accordance with an increase in a parameter related to the movement amount, and the parameter has been set to be greater than a reference value in the case where the comparison reveals the movement amount is greater than the predetermined threshold amount, and to be smaller than the reference value in the case where the comparison reveals the movement amount of the virtual camera is smaller than the predetermined threshold amount; and display an image including the blurred area on the display apparatus.

6. A method for displaying an image of a virtual space on a display of an image processing apparatus, comprising:

generating, as a reference image, the image of the virtual space viewed from a virtual camera which is set in the virtual space;

determining, in the reference image, a predetermined area which includes pixels corresponding to a predetermined position in a viewing direction of the virtual camera;

setting a predetermined non-zero movement threshold amount;

comparing a movement amount of the virtual camera with the predetermined movement amount; and blurring an area outside the predetermined area in the reference image on the basis of a blurring degree obtained in accordance with the following amounts: a depth value of the pixels, and the comparison of movement amount of the virtual camera with the predetermined movement amount such that the blurring degree increases in accordance with an increase in a parameter related to the movement amount, and the parameter has been set to be greater than a reference value in the case where the comparison reveals the movement amount is greater than the predetermined threshold amount, and to be smaller than the reference value in the case where the comparison reveals the movement amount of the virtual camera is smaller than the predetermined threshold amount; and displaying an image including the blurred area on the display.

7. A system for generating an image viewed from a virtual camera situated in a virtual space, the system comprising:

a processor; and a memory coupled to said processor, said memory storing instructions that, when executed by said processor, control said processor to:

rotate the virtual camera;

compare the amount of rotation of the virtual camera per unit time to a nonzero threshold amount;

in the case where the comparison reveals a rotation amount of the virtual camera per unit time exceeds the non-zero threshold amount, draw a first drawing target object included in a first area which includes a center of rotation of the virtual camera, draw a second drawing target object included in a second area, which surrounds the first area, so as to be a blurred image compared to the first drawing target object, and generate a screenful of a display image based on the virtual camera, the generated screenful of a display image structured to focus a user's attention within the first area even in the case where the screenful of the display image changes due to rotation of the virtual camera about the center of rotation; and in the case where the comparison reveals a rotation amount of the virtual camera per unit time is less than the non-zero threshold amount, generating images showing both the first and second objects from the continually changing viewpoint without blurring the second object.

8. A method for generating an image viewed from a virtual camera situated in a virtual space, comprising:

rotating the virtual camera;

comparing the amount of rotation of the virtual camera per unit time to a nonzero threshold amount;

in the case where the comparison reveals a rotation amount of the virtual camera per unit time exceeds the non-zero threshold amount, drawing a first drawing target object included in a first area which includes a center of rotation of the virtual camera, drawing a second drawing target object included in a second area, which surrounds the first area, so as to be a blurred image compared to the first drawing target object, and generating a screenful of a display image based on the virtual camera structured to focus a user within the first area even in the case where the screenful of the display image changes due to rotation of the virtual camera about the center of rotation; and in the case where the comparison reveals a rotation amount of the virtual camera per unit time is less than the non-zero threshold amount, generating images showing both the first and second objects from the continually changing viewpoint without blurring the second object.

9. A non-transitory computer readable storage medium having stored thereon an image processing program executed by a computer of an image processing apparatus for displaying an image of a virtual space on a display apparatus, the image processing program causing the computer to execute:

generating, as a reference image, the image of the virtual space viewed from a virtual camera which is set in the virtual space;

determining, in the reference image, a predetermined area which includes pixels corresponding to a predetermined position in a viewing direction of the virtual camera;

setting a predetermined non-zero movement threshold amount;

comparing a movement amount of the virtual camera with the predetermined movement amount; and blurring an area outside the predetermined area in the reference image on the basis of a blurring degree obtained in accordance with the following amounts: a depth value of the pixels, and the comparison of movement amount of the virtual camera with the predetermined movement amount such that the blurring degree increases in accordance with an increase in a parameter related to the movement amount, and the parameter has been set to be greater than a reference value in the case where the comparison reveals the movement amount is greater than the predetermined threshold amount, and to be smaller than the reference value in the case where the comparison reveals the movement amount of the virtual camera is smaller than the predetermined threshold amount; and displaying an image including the blurred area on the display apparatus.

10. The non-transitory computer readable storage medium according to claim 9, wherein the computer calculates, as a correction value, said parameter, and the computer further calculates on the basis of a depth value of said each of the pixels, as a synthesis rate, a rate of synthesizing the reference image and an image obtained by blurring an area in the reference image, and then the computer determines the blurring degree on the basis of the corrected synthesis rate which has been obtained by multiplying the synthesis rate by the correction value.

11. The non-transitory storage medium according to claim 10, wherein the computer calculates the synthesis rate of said each of the pixels in the area outside the predetermined area such that the blurring degree increases in accordance with an increase in a difference between the depth value of said each of the pixels and a depth value at a focus point of the virtual camera.

12. The non-transitory storage medium according to claim 11 wherein the computer determines the predetermined area in accordance with a position of the focus point of the virtual camera.

13. The non-transitory storage medium according to claim 12 wherein, the computer determines, as the predetermined area in the reference image, an area including pixels whose depth value and the depth value at the focus point are different from each other by a predetermined value or less.

14. The non-transitory storage medium according to claim 10 wherein
generating the reference image is executed repeatedly at a rate of once per predetermined time period, and
calculating the correction value is executed each time the reference image is generated.

15. The non-transitory storage medium according to claim 10 wherein the computer calculates the correction value by using a predetermined value as the reference value such that the correction value increases in accordance with an increase in a magnitude of the movement amount.

16. The non-transitory storage medium according to claim 10, wherein a correction value is calculated such that the correction value gradually increases up to an upper limit in the case where a movement amount of the virtual camera is equal to or greater than a predetermined amount, and gradually decreases toward a lower limit where the movement amount is less than the predetermined amount.

17. The non-transitory storage medium according to claim 9 wherein the computer determines the predetermined area in accordance with a position of a focus point of the virtual camera.

18. The non-transitory storage medium according to claim 17 wherein the computer determines, as the predetermined area in the reference image, an area including pixels whose depth value and a depth value at a focus point are different from each other by a predetermined value or less.

19. The non-transitory storage medium according to claim 9, wherein
the image processing program further causes the computer to execute rotating the virtual camera around the predetermined position such that the virtual camera is facing the predetermined position,
the computer determines, as the predetermined area, an area including pixels corresponding to an object existing in a predetermined space which includes the predetermined position in the virtual space, and
the computer uses a rotation amount of the virtual camera as the movement amount of the virtual camera.

20. The non-transitory storage medium according to claim 9 wherein,
the image processing program further causes the computer to execute generating a blurred image of the reference image by using the reference image, and
the computer synthesizes, as a blurring process, the reference image and the blurred image at a synthesis rate corresponding to the blurring degree.

21. The non-transitory storage medium according to claim 9, wherein the movement amount of the virtual camera is equivalent to a rotation angle of the virtual camera.

22. The non-transitory storage medium according to claim 9, wherein the movement amount of the virtual camera is equivalent to a change amount of a position of the virtual camera.

23. A graphical image generating system of the type which generates for display to a viewer, graphical images of first and second objects in a 3D virtual space from the viewpoint of a virtual camera, the graphical image generating system comprising:
a memory device that stores instructions and data representing the 3D virtual space including the first and second objects; and
at least one processor operatively coupled to the memory device, the at least one processor executing stored instructions to produce images of the 3D virtual space including the first and second objects by:
(a) selectively rotating the virtual camera around the first object to provide a continually changing viewpoint creating the impression that the viewer is rotating around the first object;
(b) comparing the amount of rotation of the virtual camera around the first object with a non-zero threshold;
(c) when the comparison reveals that the amount of rotation of the virtual camera around the first object is less than the non-zero threshold, generating images showing both the first and second objects from the continually changing viewpoint without blurring the second object; and
(d) when the comparison reveals that the amount of rotation of the virtual camera around the first object is more than the non-zero threshold, generating images showing both the first and second objects from the continually changing viewpoint but blurring, in the generated images, the second object but not the first object by an amount based on the rate of rotation of the virtual camera around the first object to thereby structure the generated images to focus the viewer on the first object from the continually changing viewpoint despite shifting of the second object in the generated images.

* * * * *